US010608696B2

United States Patent
Yi et al.

(10) Patent No.: US 10,608,696 B2
(45) Date of Patent: Mar. 31, 2020

(54) METHOD AND APPARATUS FOR PERFORMING FREQUENCY HOPPING FOR MTC UE IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Hanbyul Seo, Seoul (KR); Suckchel Yang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/560,108

(22) PCT Filed: Mar. 31, 2016

(86) PCT No.: PCT/KR2016/003355
§ 371 (c)(1),
(2) Date: Sep. 20, 2017

(87) PCT Pub. No.: WO2016/159696
PCT Pub. Date: Oct. 6, 2016

(65) Prior Publication Data
US 2018/0102806 A1 Apr. 12, 2018

Related U.S. Application Data

(60) Provisional application No. 62/141,254, filed on Mar. 31, 2015, provisional application No. 62/143,808,
(Continued)

(51) Int. Cl.
*H04B 1/713* (2011.01)
*H04L 5/00* (2006.01)
(Continued)

(52) U.S. Cl.
CPC ............. *H04B 1/713* (2013.01); *H04B 1/707* (2013.01); *H04B 1/7136* (2013.01); *H04L 5/003* (2013.01);
(Continued)

(58) Field of Classification Search
CPC ...... H04B 1/713; H04B 1/715; H04B 1/7156; H04B 7/0617; H04B 1/707;
(Continued)

(56) References Cited

U.S. PATENT DOCUMENTS

2009/0011767 A1  1/2009  Malladi et al.
2009/0316758 A1* 12/2009 Ahn ..................... H04B 1/7143
                                                              375/135
(Continued)

FOREIGN PATENT DOCUMENTS

CN  105430750  3/2016
WO  2013067386  5/2013
(Continued)

OTHER PUBLICATIONS

PCT International Application No. PCT/KR2016/003356, International Search Report dated Jul. 8, 2016, 3 pages.
(Continued)

*Primary Examiner* — David C Payne
*Assistant Examiner* — Sarah Hassan
(74) *Attorney, Agent, or Firm* — Lee Hong Degerman Kang Waimey

(57) ABSTRACT

A method and apparatus for communicating with a machine type communication user equipment (MTC UE) in a wireless communication system is provided. A base station (BS) configures a radio frame for the MTC UE based on a duration of a frequency hopping subframe group (FH-SFG), and communicates with the MTC UE by using the configured radio frame.

15 Claims, 23 Drawing Sheets

Related U.S. Application Data filed on Apr. 7, 2015, provisional application No. 62/210,943, filed on Aug. 27, 2015, provisional application No. 62/213,111, filed on Sep. 2, 2015, provisional application No. 62/232,420, filed on Sep. 24, 2015, provisional application No. 62/244,729, filed on Oct. 21, 2015.

(51) Int. Cl.
| | | |
|---|---|---|
| *H04B 1/707* | (2011.01) | |
| *H04W 4/70* | (2018.01) | |
| *H04B 1/7136* | (2011.01) | |
| *H04W 72/04* | (2009.01) | |

(52) U.S. Cl.
CPC ............. *H04L 5/0012* (2013.01); *H04W 4/70* (2018.02); *H04W 72/0446* (2013.01); *H04L 5/0007* (2013.01); *H04W 72/0406* (2013.01)

(58) Field of Classification Search
CPC .... H04B 1/71635; H04B 1/7172; H04B 7/02; H04B 7/0626; H04B 7/063; H04B 17/309
USPC .......................................... 375/260; 370/329
See application file for complete search history.

(56) References Cited

U.S. PATENT DOCUMENTS

| | | | |
|---|---|---|---|
| 2011/0069696 A1* | 3/2011 | Iwamura | H04W 48/12 370/350 |
| 2013/0294399 A1* | 11/2013 | Lee | H04W 4/005 370/330 |
| 2013/0315215 A1 | 11/2013 | Beale | |
| 2014/0078941 A1 | 3/2014 | Seo et al. | |
| 2014/0153452 A1* | 6/2014 | Son | H04L 5/001 370/280 |
| 2015/0271840 A1 | 9/2015 | Tavildar et al. | |
| 2016/0081084 A1* | 3/2016 | Blankenship | H04W 4/70 370/329 |
| 2017/0280483 A1 | 9/2017 | Liu et al. | |
| 2017/0373715 A1 | 12/2017 | Moroga et al. | |
| 2018/0035242 A1* | 2/2018 | Yi | H04L 5/0037 |
| 2018/0076924 A1 | 3/2018 | Lee et al. | |

FOREIGN PATENT DOCUMENTS

| | | |
|---|---|---|
| WO | 2014110757 | 7/2014 |
| WO | 2014165838 | 10/2014 |
| WO | 2016045562 | 3/2016 |

OTHER PUBLICATIONS

Nokia, "Data Channel Enhancement for MTC", 3GPP TSG RAN WG1 Meeting #79, R1-144993, Nov. 2014, 8 pages.
ZTE, "Discussion on physical uplink control channel for MTC enhancement", 3GPP TSG RAN WG1 Meeting #80, R1-150144, Feb. 2015, 6 pages.
NEC, "Frequency hopping schemes for LTE Rel-13 MTC", 3GPP TSG RAN WG1 Meeting #80, R1-150286, Feb. 2015, 6 pages.
United States Patent and Trademark Office U.S. Appl. No. 15/558,444, Office Action dated Jun. 1, 2018, 23 pages.
European Patent Office Application No. 16773478.9, Search Report dated Sep. 27, 2018, 10 pages.
CATT, "Discussion on UE RF Bandwidth Reduction," 3GPP TSG RAN WG1 Meeting #79, R1-144618, San Francisco, USA, Nov. 17-21, 2014, 2 pages.
Sony, "MTC Operation with a Narrowband PDCCH," 3GPP TSG-RAN WG1 Meeting #80, R1-150428, Athens, Greece, Feb. 9-13, 2015, 16 pages.
NTT DOCOMO, "Performance Evaluation of PDSCH for Low Complexity MTC," 3GPP TSG RAN WG1 Meeting #80, R1-150531, Athens, Greece, Feb. 9-13, 2015, 5 pages.
United States Patent and Trademark Office U.S. Appl. No. 15/558,444, Final Office Action dated Dec. 31, 2018, 14 pages.
PCT International Application No. PCT/KR2016/003355, International Search Report dated Jul. 22, 2016, 2 pages.
United States Patent and Trademark Office U.S. Appl. No. 16/514,161, Notice of Allowance dated Nov. 29, 2019, 9 pages.

* cited by examiner

METHOD AND APPARATUS FOR PERFORMING FREQUENCY HOPPING FOR MTC UE IN WIRELESS COMMUNICATION SYSTEM

CROSS-REFERENCE TO RELATED APPLICATIONS

This application is the National Stage filing under 35 U.S.C. 371 of International Application No. PCT/KR2016/003355, filed on Mar. 31, 2016, which claims the benefit of U.S. Provisional Application No. 62/141,254, filed on Mar. 31, 2015, 62/143,808, filed on Apr. 7, 2015, 62/210,943, filed on Aug. 27, 2015, 62/213,111, filed on Sep. 2, 2015, 62/232,420, filed on Sep. 24, 2015 and 62/244,729, filed on Oct. 21, 2015, the contents of which are all hereby incorporated by reference herein in their entirety.

BACKGROUND OF THE INVENTION

Field of the Invention

The present invention relates to wireless communications, and more particularly, to a method and apparatus for performing frequency hopping for a machine-type communication (MTC) user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

Some MTC UEs may be installed in the basements of residential buildings or locations shielded by foil-backed insulation, metalized windows or traditional thick-walled building construction. These MTC UEs may experience significantly greater penetration losses on the radio interface than normal LTE UEs. Thus, for these MTC UEs, coverage enhancement may be required. The MTC UEs in the extreme coverage scenario may have characteristics such as very low data rate, greater delay tolerance, and no mobility, and therefore, some messages/channels may not be required.

For efficient MTC transmission method, a new frame structure for MTC transmission has been discussed lately. Further, various enhancements of MTC transmission method based on the new frame structure for MTC have also been considered.

SUMMARY OF THE INVENTION

The present invention provides a method and apparatus for performing frequency hopping for a machine-type communication (MTC) user equipment (UE) in a wireless communication system. The present invention provides a transmission structure to transmit broadcast and unicast while frequency hopping and half-duplex frequency division duplex (FDD) (or time division duplex (TDD)) are assumed. The present invention provides a method and apparatus for defining a control channel and a data channel in a MTC transmission time interval (M-TTI). The present invention provides a method and apparatus for defining a frequency hopping subframe group (FH-SFG) for cell common and unicast monitoring. The present invention provides a method and apparatus for defining details of frequency hopping. The present invention provides a method and apparatus for configuring repetition and frequency hopping.

In an aspect, a method for communicating, by a base station (BS), with a machine type communication user equipment (MTC UE) in a wireless communication system is provided. The method includes configuring a radio frame for the MTC UE based on a duration of a frequency hopping subframe group (FH-SFG), and communicating with the MTC UE by using the configured radio frame.

In another aspect, a base station (BS) in a wireless communication system is provided. The base station includes a memory, a transceiver, and a processor coupled to the memory and the transceiver. The processor is configured to configure a radio frame for a machine type communication user equipment (MTC UE) based on a duration of a frequency hopping subframe group (FH-SFG), and control the transceiver to communicate with the MTC UE by using the configured radio frame.

An efficient frame structure and/or frequency hopping mechanism can be provided for MTC transmission.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
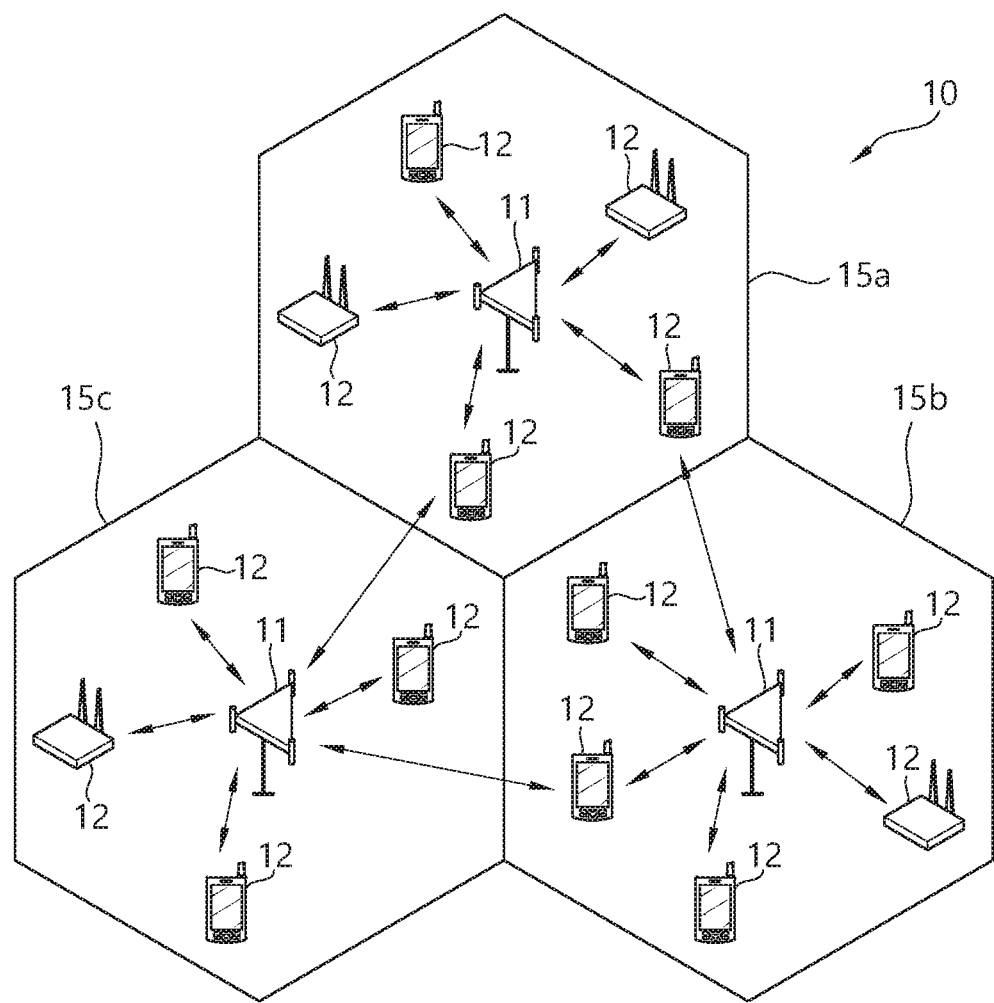
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
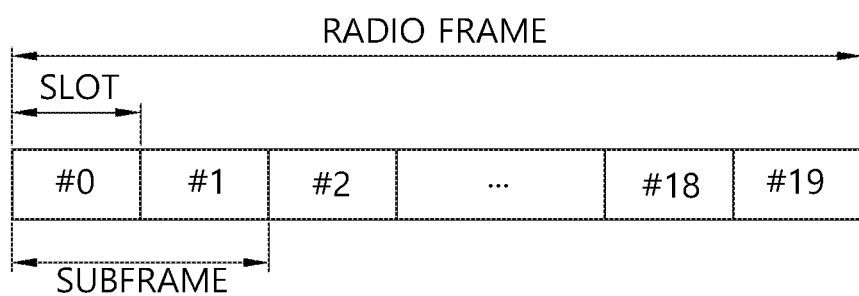
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
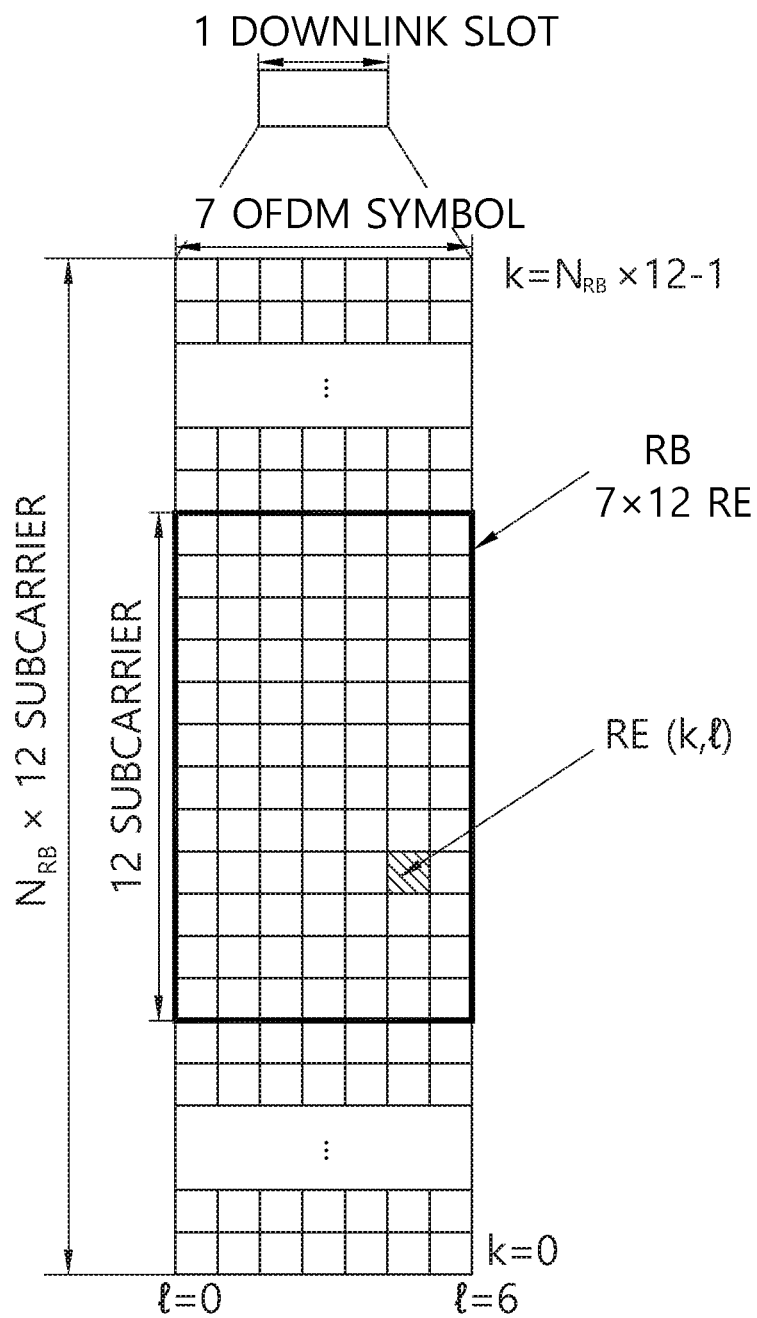
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
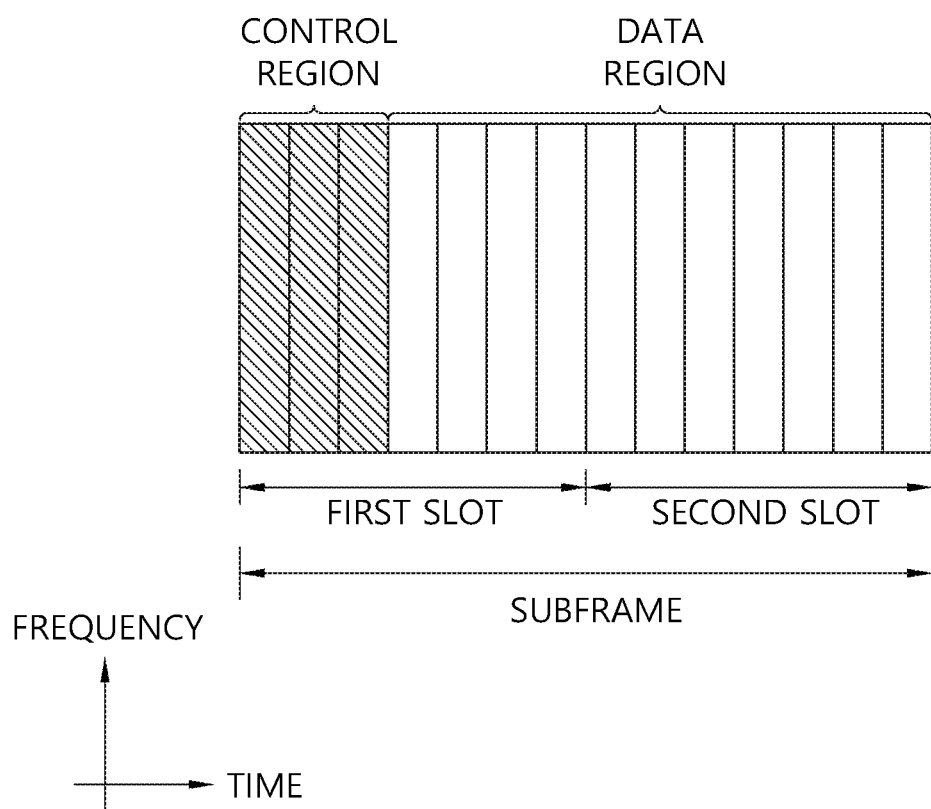
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PC-FICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
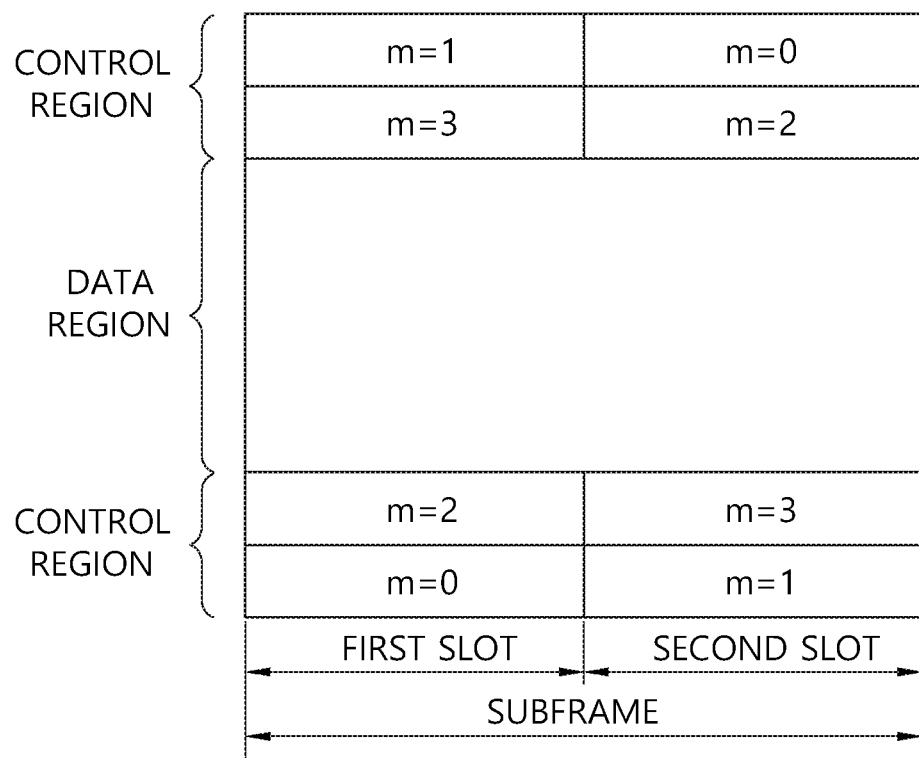
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification. Hereinafter, a MTC UE may be referred to as one of a UE requiring coverage enhancement (CE), a low cost UE, a low end UE, a low complexity UE, a narrow(er) band UE, a small(er) band UE, or a new category UE. Or, just a UE may refer one of UEs described above.

In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

If a system bandwidth is larger than 1.4 MHz, it is likely that more than one subband may be configured. A subband may refer to a resource allocation unit for MTC UE which may use a narrow bandwidth. A subband may be a part of a system bandwidth. Hereinafter, let's assume that there are M subbands configured for a system bandwidth. Since a UE cannot receive broadcast+unicast or broadcast+broadcast or unicast+unicast simultaneously, and also, a UE may require one slot or one subframe to perform frequency retuning if subband changes, careful considerations on multiplexing should be considered.

Among M subbands configuring the system bandwidth, it may be simply assumed that there is one subband carrying physical broadcast channel (PBCH), and another subband carrying system information block 1 for MTC (hereinafter MTC-SIB1), and another subband carrying system information block 2 for MTC (hereinafter MTC-SIB2), and so on. Each subband may be the same. Or, each subband may be configured by previous channel. For example, PBCH may configure a subband for MTC-SIB1, and MTC-SIB1 may configure a subband for MTC-SIB2. Regardless of subband, a cell-specific subband hopping pattern may be configured. For example, for subband i, it may jump to the location of subband j where j=fk (system frame number (SFN), cell ID). Here, k is the index of hopping pattern. This example shows that hopping occurs in every radio frame. However, the hopping may occur in multiple subframes rather than a radio frame unit.

For primary synchronization signal (PSS)/secondary synchronization signal (SSS)/PBCH reading, the UE may stay in the center 6 PRBs. Subband/frequency hopping may be disabled for PSS/SSS/PBCH. In other words, the center 6 PRBs may always be used to transmit PSS/SSS/PBCH.

For paging reading, if a UE is in RRC_CONNECTED mode, a UE may assume that paging occurs in a subband where the UE is configured to monitor unicast data and/or control signal. If a UE is in RRC_IDLE mode, a UE may assume that the paging subband is configured or indicated by the network based on UE ID or some other means. While a UE is reading paging, it may not be required to receive any other data/control signal until receiving paging message is completed.

For MTC-SIB1 reading, if the MTC-SIB1 is read since MTC-SIB1 update, a UE may not be required to receive any other data/control signal until the MTC-SIB1 reading is completed. If the MTC-SIB1 is read based on UE autonomous behavior (e.g. update SIB due to timer expiration, etc.), the UE may also read other unicast data. If there is on-going unicast transmission, the UE may not be required to receive SIB(s) simultaneously.

For other SIB(s), if a UE reads SIB(s) because of SIB(s) update, a UE may not be required to receive any unicast data until updating SIB(s) is completed.

Figure 6:
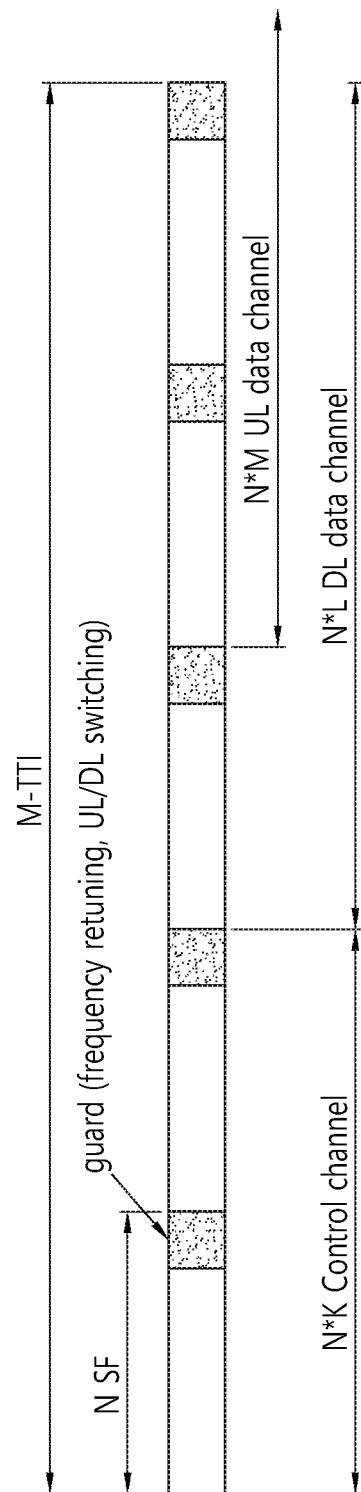
FIG. 6 shows an example of a frame structure for MTC according to an embodiment of the present invention.

FIG. 6 shows an example of a frame structure for MTC according to an embodiment of the present invention. Referring to FIG. 6, MTC-TTI (M-TTI) may be configured. M-TTI may refer to a time unit for transmitting data to MTC UEs. M-TTI may be longer than a conventional TTI described in FIG. 2 above. M-TTI may include multiple N subframes. In each N subframes, (N−1) subframes may be used for transmitting data to MTC UEs and channel estimation, and the remaining 1 subframe may be used as a guard period, which allows frequency retuning, UL/DL switching, etc. Frequency retuning gap may not be necessary if frequency retuning latency is small. In the M-TTI, N*K subframes may be used for control channel, and N*L subframes may be used for DL data channel. Further, N*M subframes may be used for UL data channel.

Figure 7:
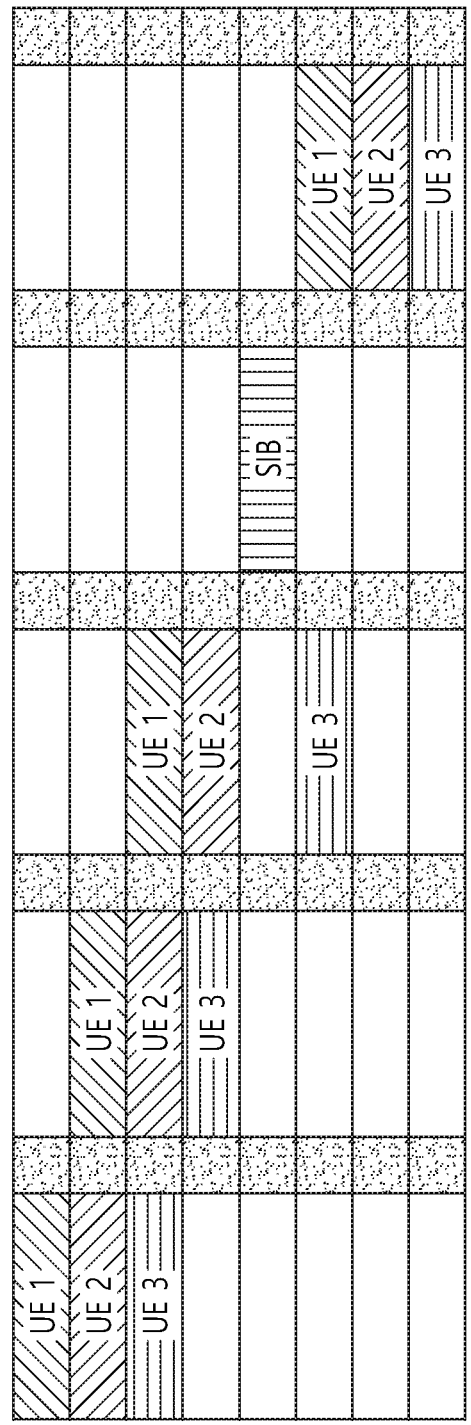
FIG. 7 shows an example of a frequency hopping and UE subband monitoring pattern according to an embodiment of the present invention.

FIG. 7 shows an example of a frequency hopping and UE subband monitoring pattern according to an embodiment of the present invention. To maximize frequency diversity with multi-subframes channel estimation, frequency hopping or switching of subband may occur in every N subframes. Referring to FIG. 7, in every N subframes, the location of subband for each UE changes. Further, to avoid potential collision between unicast data and/or control signal with broadcast data, one subband may be reserved for broadcast data which may not be used for frequency hopping. Referring to FIG. 7, SIB is transmitted in a subband without frequency hopping. Alternatively, frequency hopping of the subband where SIB is carried may be allowed as well.

For the simplicity, a UE may not perform frequency hopping across the system bandwidth within N subframes. The N subframes may be called as frequency hopping subframe group (FH-SFG). Referring to FIG. 7, frequency hopping occurs in every N subframes, but does not occur within each N subframe. Thus, if a UE needs to read broadcast data in different subbands where broadcast data transmission occurs in less than N subframes, the UE may not read unicast data during that N subframes regardless of whether the subframes carry broadcast data. Alternatively, a UE may also read unicast data in a subframe where broadcast data is not transmitted. Moreover, UL/DL switching may not occur within FH-SFG. This may be applied for TDD. In TDD, if a UE is in DL mode, UL subframes may not be utilized in a FH-SFG. And if a UE is in UL mode, DL subframes may not be utilized/monitored within a FH-SFG. If the network wants to utilize all DL/UL subframes, the network may configure N=2, which means that subband/frequency hopping may occur in multiples of FH-SFG rather than in every FH-SFG. More generally, the hopping pattern and/or hopping interval may be configured by the network via master information block (MIB), SIB, or higher layer signaling.

Hereinafter, frequency hopping mechanism to minimize effects of frequency retuning latency according to an embodiment of the present invention is described. Due to limited hardware capability, frequency retuning latency for MTC UE may be larger than 200 us. It is expected that one slot or one subframe may be reserved for frequency retuning latency. Thus, one slot/subframe may not be used for data repetition for MTC UE. This may result in high overhead/low spectral efficiency from unused slots/subframes for MTC UEs. Particularly, if there are only MTC UEs in the system, those slots/subframes may not be used at all. To minimize the impact of frequency retuning latency, at least one of the following options may be considered in the present invention.

(1) Option 1: Two or more UEs may be shared/interlaced in one subband to minimize not-schedulable subframes. That is, two UEs may be interlaced within one FH-SFG, and one UE utilizes the first subframe (or first slot) as a guard/frequency retuning subframe (slot) and the other UE utilizes the last subframe as a guard/frequency retuning subframe (or slot).

Figure 8:
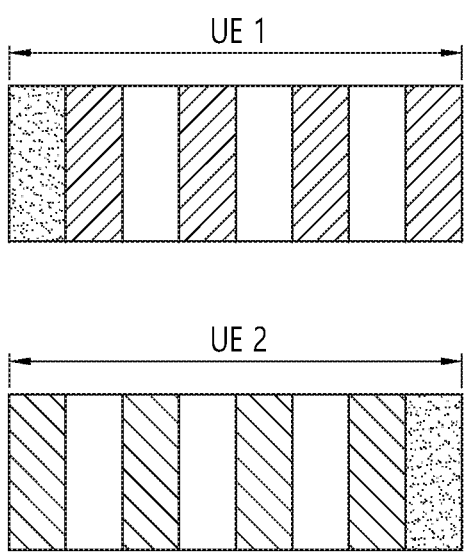
FIG. 8 shows an example of interlacing two UEs for MTC according to an embodiment of the present invention.

FIG. 8 shows an example of interlacing two UEs for MTC according to an embodiment of the present invention. Referring to FIG. 8, if FH-SFG consists of 8 subframes, two UEs may be multiplexed, and each UE may be scheduled with up to 4 subframes in a FH-SFG. UE 1 may be scheduled in 2/4/6/8th subframes, and UE 2 may be scheduled 1/3/5/7th subframes. Frequency retuning latency for UE 1 may be placed in 1st subframe, and frequency retuning latency for UE 2 may be placed in 8th subframe (i.e. last subframe).

(2) Option 2: Two or more UEs may be multiplexed in one subband. More specifically, two or more UEs may share one subband, and frequency retuning latency/subframe may be placed after scheduling. Different UEs may be configured with different starting of transmission in a FH-SFG such that other UE may be scheduled in frequency retuning subframe of another UE. That is, each UE may utilize consecutive subframes (among valid DL (V-DL) subframes or valid UL (V-UL) subframes) where frequency retuning gap may be placed at the end of transmission and the transmission may start in different time.

Figure 9:
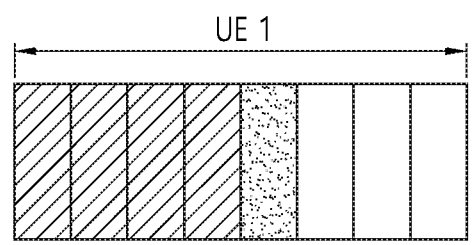
FIG. 9 shows an example of multiplexing two UEs for MTC according to an embodiment of the present invention.
Figure 9:
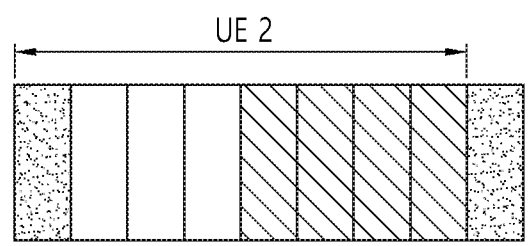

FIG. 9 shows an example of multiplexing two UEs for MTC according to an embodiment of the present invention. Referring to FIG. 9, UE 1 may be scheduled in 1st to 4th subframes, and frequency retuning latency for UE 1 may be placed in 5th subframe. UE 2 may be scheduled in 5th to 8th subframes, and frequency retuning latency for UE 2 may be placed in 1st subframe.

(3) Option 3: Two or more UEs may be multiplexed in different subbands. If subband hopping occurs in two subbands, UEs scheduled in each subband may take different frequency hopping gap subframe.

Figure 10:
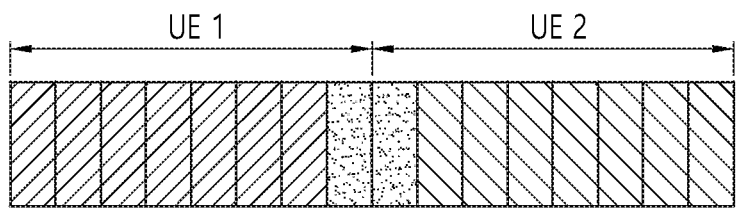
FIG. 10 shows another example of multiplexing two UEs for MTC according to an embodiment of the present invention.
Figure 10:
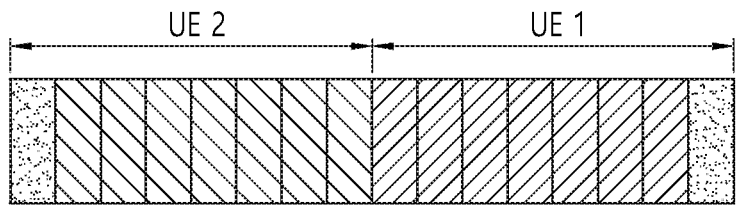

FIG. 10 shows another example of multiplexing two UEs for MTC according to an embodiment of the present invention. Referring to FIG. 10, subband 1 starting UE (i.e. UE 1) may take the last subframe as a gap, and subband 2 starting UE (i.e. UE 2) may take the first subframe as a gap. If this is used, gap subframe may be usable at least for one UE group. In other words, UEs allocated with the same subband may take the same frequency retuning gap (either the first or last in a FH-SFG).

For options described above, whether this type of operation is used or not and which option is used may be configured by higher layer. Once the UE knows which option is used, the UE may apply the transmission subframe based on its UE-ID or C-RNTI. The same mechanism may also be applied for data transmission as well. If multiple HARQ processes are used, combining option 1 and option 2 may also be considered. When multiple subbands are used for frequency hopping, the gap location may be determined by the subband index. For example, even subbands may use the first subframe (slot) as a gap, and odd subbands may use the last subframe (slot) as a gap. In this case, two different data may be scheduled/transmitted with different HARQ process IDs belonging to each UE where each UE may be multiplexed by time division multiplexing (TDM).

Figure 11:
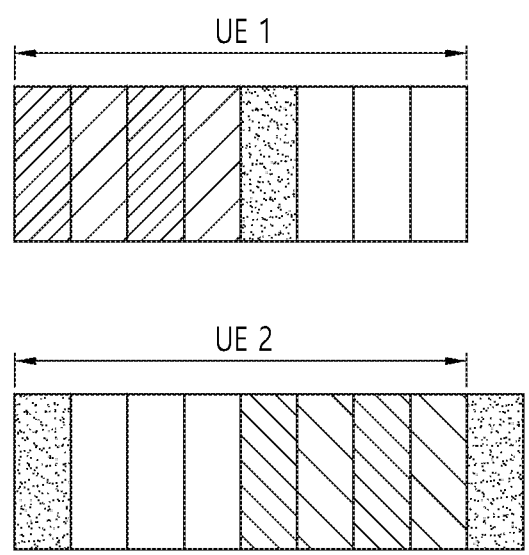
FIG. 11 shows another example of multiplexing two UEs for MTC according to an embodiment of the present invention.

FIG. 11 shows another example of multiplexing two UEs for MTC according to an embodiment of the present invention. Referring to FIG. 11, as similar as FIG. 9, UE 1 may be scheduled in 1st to 4th subframes, and frequency retuning latency for UE 1 may be placed in 5th subframe. However, two different data may be scheduled with different HARQ processes in 1st to 4th subframes. UE 2 may be scheduled in 5th to 8th subframes, and frequency retuning latency for UE 2 may be placed in 1st subframe. However, two different data may be scheduled with different HARQ processes in 5th to 8th subframes.

Hereinafter, a control channel and a data channel in an M-TTI according to an embodiment of the present invention is described. For defining control channel and data channel relationship, one on the following approaches may be considered.

(1) Approach 1: Starting subframe of control channel may be configured UE-specifically and PDSCH may start at the end of control channel. Different period for control channel repetition/monitoring subframe set may be configured. Spectral efficiency, scheduling latency may depend on how often PDCCH monitoring can occur.

(2) Approach 2: Control channel and data channel may be scheduled/multiplexed in a preconfigured subframes. For one example, one control region may contain only one control channel based on the lowest aggregation level. Or, one control region may contain more than one control channels based on the lowest aggregation level. To support approach 2, different offset for MTC PDSCH (M-PDSCH) per UE may be configured. Or, the same offset per subband may be configured. In addition, a separate offset may be configured per UE additionally or alternatively.

Figure 12:
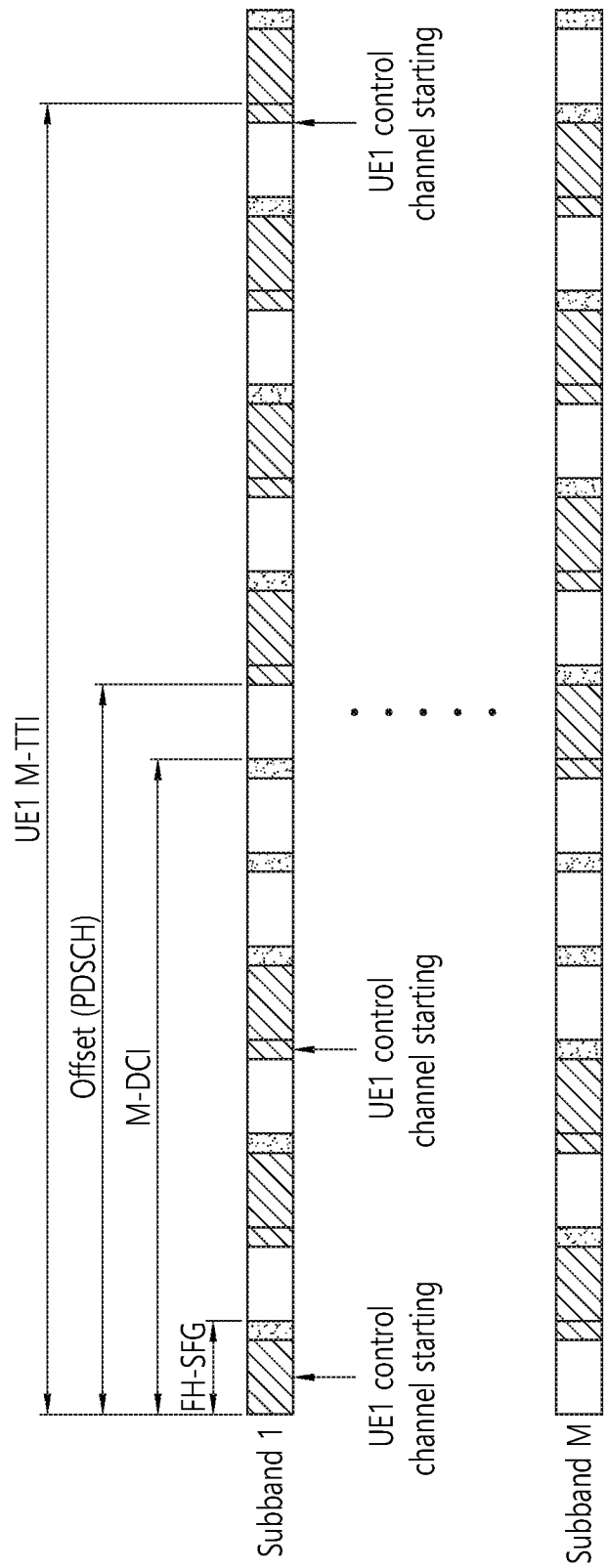
FIG. 12 shows another example of a frame structure for MTC according to an embodiment of the present invention.

FIG. 12 shows another example of a frame structure for MTC according to an embodiment of the present invention. Referring to FIG. 12, a UE may be configured with more than one control channel search subframe in an MTC DCI (M-DCI) within an M-TTI. In this case, a bitmap of starting subframes within an M-DCI may be configured. Or, a UE may be configured with duration of M-DCI and duration of one control channel repetition, where a UE may monitor multiple candidate subframes if M-DCI duration is larger than one control channel repetition duration.

In summary, frame structure for a MTC UE may be configured based on at least one of the following aspects.

(1) Duration of FH-SFG: The duration of FH-SFG may be configured or prefixed regardless of V-DL subframes or V-UL subframes. Or, the duration of FH-SFG may be configured by counting only V-DL subframe or V-UL subframes. For example, the duration of FH-SFG may be configured by one radio frame or half-radio frame.

(2) Frequency retuning gap subframe (or slot): The frequency retuning gap subframe may be determined based on subband index allocated to a UE (e.g. even subband takes the first subframe (or slot) as a frequency retuning gap). If subband hopping or frequency hopping occurs only in two subbands, a UE allocated with the first subband as a starting subband may take first subframe as a frequency retuning gap and a UE allocated with the second subband as a starting subband may take the last subframe as a frequency retuning gap.

(3) Duration of M-TTI: The duration of M-TTI may be prefixed or configured.

(4) Period/offset/duration of M-DCI: Different offset of M-DCI may be configured for each UE. Period/duration of M-DCI may be configured by broadcast signaling such as SIB, whereas offset of M-DCI may be configured by UE-specific signaling. If configuration is not given, a UE may assume that M-TTI is the same as period of M-DCI. Alternatively, or additionally, a bitmap of control channel starting subframe set within an M-DCI or M-TTI may be configured. If multiple starting subframes in an M-TTI are available, the starting subframe of M-PDSCH may start from the start of M-TTI rather than depending on the starting subframe of control channel.

(5) Period/offset/duration of M-PDSCH: Different offset of M-PDSCH may be configured for each UE. Period/duration of M-PDSCH may be configured by broadcast signaling such as SIB, whereas offset of M-PDSCH may be configured by UE-specific higher layer signaling. If configuration is not given, a UE may assume that M-TTI is the same as period of M-PDSCH. For a data channel (either for DL or UL), starting subframe index or offset and also duration may be configured or indicated by DCI.

(6) Set of valid DL subframes and valid UL subframes

Hereinafter, FH-SFG for cell common data and unicast data monitoring according to an embodiment of the present invention is described. Assuming FH-SFG is defined as described above, further clarification on how frequency hopping occurs when a UE needs to read both cell common data and unicast data needs to be defined. For frequency hopping, there may be some alternatives to form subband among different channels. For example, SIB1 and SIB2 may be transmitted in different subbands, and also, random access response (RAR) and SIB may be transmitted in different subbands, Further, paging and SIB may be transmitted in different subbands. Unicast data may be transmitted in separate subbands as well. Alternatively, SIB1/SIB2 or common channels that a UE needs to read at the same time may be transmitted in the same subband. For example, paging and SIB(s) may be transmitted in the same subband. A UE may not need to monitor multiple subbands to read some common channels transmitted in a same M-TTI. In both cases, if a UE needs to hop different frequency subbands to read common channel by having one subframe (or one slot) before and after reading common channel, the following may be frequency bands that a UE needs to read.

Figure 13:
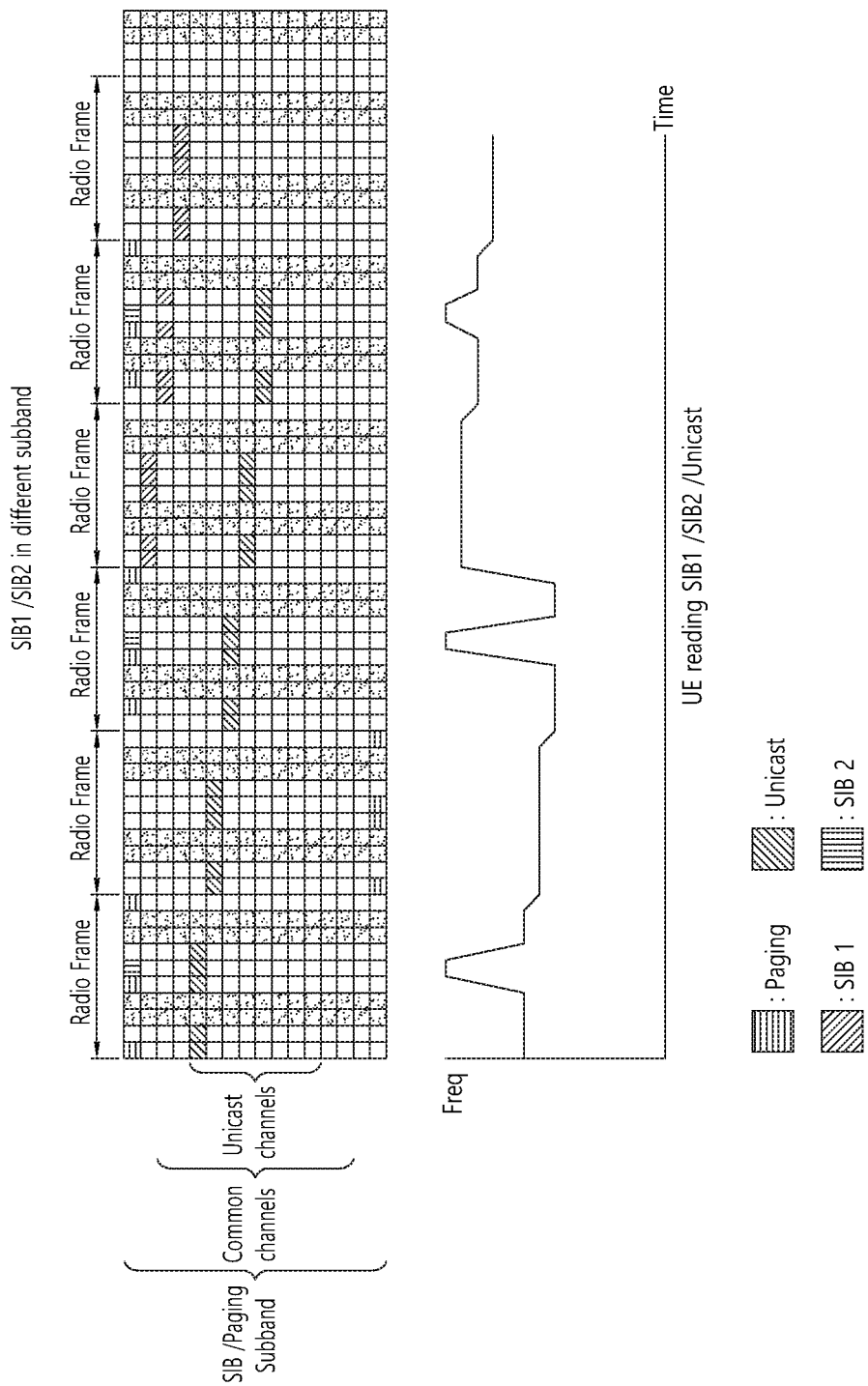
FIG. 13 shows an example of FH-SFG for cell common data and unicast data monitoring according to an embodiment of the present invention.

FIG. 13 shows an example of FH-SFG for cell common data and unicast data monitoring according to an embodiment of the present invention. Referring to FIG. 13, subbands for paging/SIB 1 transmission hop only between the lowest subband and highest subband. Other common channels may share the hopping pattern with subbands for unicast data. The UE may switch frequency/subband to read common channel while receiving unicast data when SIB1/SIB2 are transmitted in different subbands.

Figure 14:
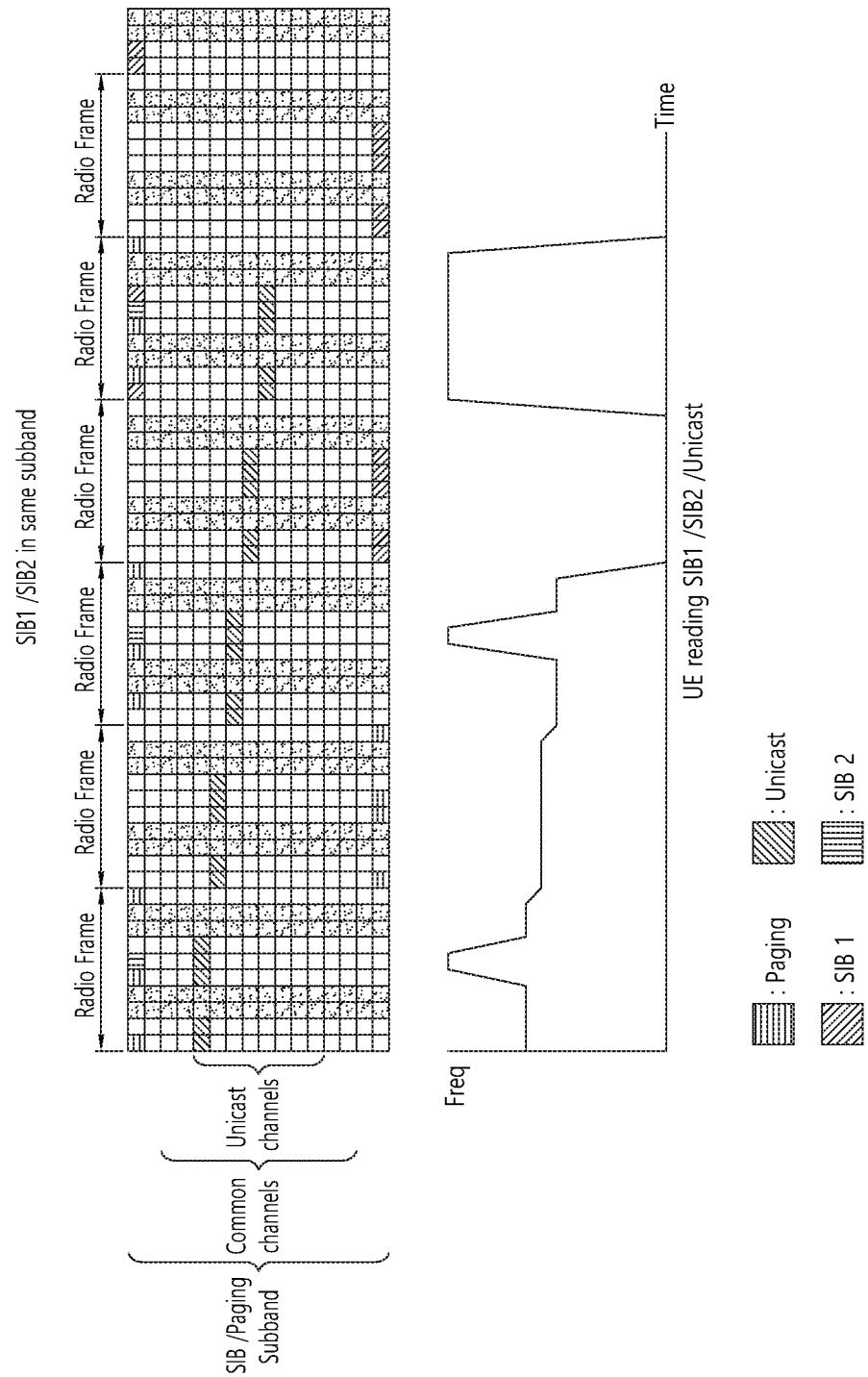
FIG. 14 shows another example of FH-SFG for cell common data and unicast data monitoring according to an embodiment of the present invention.

FIG. 14 shows another example of FH-SFG for cell common data and unicast data monitoring according to an embodiment of the present invention. Referring to FIG. 14, subbands for paging/SIB 1 transmission hop only between the lowest subband and highest subband. The UE may switch frequency/subband to read common channel while receiving unicast data when SIB1/SIB2 are transmitted in the same subband.

As described above, a UE may have to perform frequency switching more than one time within FH-SFG, if common channels are not transmitted continuously or the subframes for common channel are not fully overlapped with subframes for unicast transmission. As this may impose too much frequency retuning for a UE, at least one of the following approaches may be considered.

(1) A UE may stay in one subband within FH-SFG, regardless of whether a UE reads common data or unicast transmission. Common data may include control channel scheduling common data. Also, unicast transmission may include both control channel and data channel transmission.

(2) In terms of selecting a subband to read, a UE may give higher priority on common channels at one time. Thus, when the network schedules unicast data, the UE may skip a FH-SFG which may schedule common channel to be read by the UE. For example, a UE may not be required to read unicast transmission while receiving RAR at least in a FH-SFG. In this case, in terms of repetition number, FH-SFG may not be counted for repetition (i.e. repetition is not used in FH-SFG where a UE will monitor common channel subband). When the subband of common channel and data channel is the same, it may be possible to allow unicast transmission monitoring. However, if data is scheduled by using demodulation reference signal (DM-RS), this may not guarantee sufficient performance. Thus, unless it is explicitly configured/indicated by the network to multiplex common data and unicast data within a FH-SFG, a UE may assume that the UE can read either unicast data or cell common data in a FH-SFG.

(3) As the network may not know whether a UE reads SIB or RAR, this may lead some performance degradation if the UE performs RACH procedure often or read SIB. For a better alignment, a UE may read SIB(s) only at initial setup and when SIB update indication is triggered. In this case, if SIB1 and SIB2 are transmitted in different subbands, a UE may have to serialize reading on SIB1 and SIB2. If the location of SIB2 is indicated by SIB1, this may not be an issue. Otherwise, for lower latency, it is desirable that SIB(s) are transmitted in the same subband (if they are transmitted in the same FH-SFG). In other words, a UE may not be required to hop to different frequency in a FH-SFG. In this case, when a UE needs to read PBCH, it may not be able to monitor other common channel and/or unicast data if they are not transmitted in the center 6 PRBs. Alternatively, PBCH may be treated rather separately from other transmission, and a UE may perform frequency hop to center 6 PRBs to read PBCH in case SIB update is triggered. One subframe (or slot) before and after PBCH transmission may be used as a frequency retuning gap.

(4) When TDD is used, it may be further assumed that frequency subband between UL and DL is constant within one FH-SFG. To support this, only one hopping pattern may be used for DL/UL subbands. In other words, FH-SFG size may be determined regardless of DL or UL subframes, and frequency retuning may occur in the first or last subframe (or slot) of each FH-SFG regardless of UL or DL subframe. Within one FH-SFG, the same center frequency between DL and UL may be used. Since center frequency of UL subframe may follow center frequency of DL subframe in a FH-SFG, if a UE hops to common-data subband to read cell common data (e.g. cell-specific search space (CSS)), the UE may switch to that frequency for UL transmission as well. Thus, it is thus possible that the frequency may collide with PRACH resource (i.e. if a UE needs to transmit PRACH while it also needs to monitor CSS in a different subband). In such a case, a UE may put higher priority on cell common data over PRACH (or vice versa).

In terms of determining the monitoring subband location, a UE may follow DL monitoring subband other than PRACH transmission (if PRACH is higher prioritized over cell common data). In case of RACH procedure, a UE may follow subband location determined by RACH procedure. For example, if different subband is used for PRACH transmission based on CE level, and a UE selects a certain subband with the CE level, the UE may also expect that RAR is transmitted in the same subband. In such a case, while performing RACH procedure, a UE may determine monitoring subband based on PRACH rather than DL transmission. In such a case, if a UE is not expected to monitor more than one subband in a FH-SFG, the UE may not monitor cell-common data while performing RACH procedure (or while transmitting/receiving RACH procedure related messages such as PRACH/RAR/message 3/message 4). In other words, different subband may be configured per channel or transmission type. And, depending on the priority rule, a UE may also determine a subband which needs to be monitored within one FH-SFG.

Alternatively, cell-common data may be prioritized over other UL transmission where FH-SFG of PRACH may be selected only when a UE is not expected to monitor cell-common data in a FH-SFG. Alternatively, if there is some reason to have separate DL and UL subband management, TDM between UL and DL may also be feasible. For example, DL/UL configuration may be configured based on a unit of FH-SFG. For example, DL/UL configuration may be configured in which first FH-SFG is used for DL only and the second FH-SFG is used for UL only (and repeated). By this approach, independent subband configuration between DL/UL may be achieved without considering too much overhead. Another approach is not to schedule/transmit any UL while a UE is reading cell-common data. By this, overlapping of collision of resource of UL transmission among different UEs may be resolved. In other words, UL transmission may not be expected also in the FH-SFG where a UE monitors cell common data.

Figure 15:
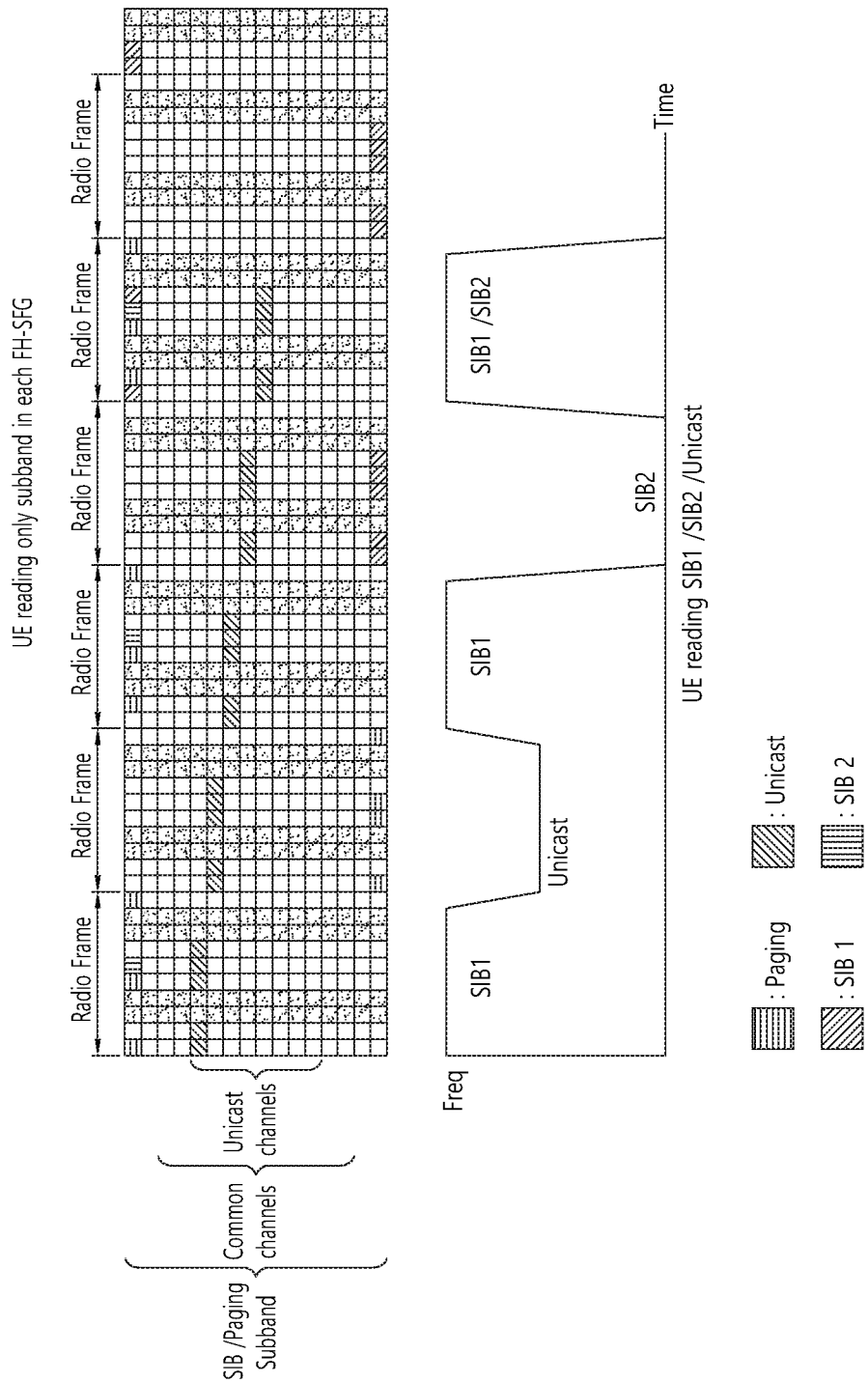
FIG. 15 shows another example of FH-SFG for cell common data and unicast data monitoring according to an embodiment of the present invention.

FIG. 15 shows another example of FH-SFG for cell common data and unicast data monitoring according to an embodiment of the present invention. Referring to FIG. 15, the UE reads only one subband in each FH-SFG.

In this case, the priority within a FH-SFG may be defined (e.g. SIB>paging>unicast). Once a UE knows that there are possibly some transmissions in a FH-SFG, the UE may switch to that subband and stay in the same subband in the entire FH-SFG. To support this, the gap between control channel and data transmission (or the starting of data transmission) may be equal to or larger than the duration of one FH-SFG. Otherwise, a UE may know that there are possibly RAR or other common channel or unicast transmission in the middle of FH-SFG where a UE may have to switch to different subband to observe the priority rule. For example, when a UE is reading unicast in a FH-SFG, the control channel of common data is decoded, and it is indicated that there is a common data transmission that a UE needs to read which has the higher priority, then a UE may have to switch frequency or disobey the priority rule. This may also apply to low complexity UE as well. Alternatively, a low complexity UE in normal coverage may switch to different subband based on the transmission.

UL TDM between PUCCH/PUSCH/PRACH according to an embodiment of the present invention is described. While scheduling DL grant, UL grant may be scheduled simultaneously. This implies that PUSCH may be requested at the same time with PUCCH. To avoid this, it may be assumed that DL grant and UL grant cannot be scheduled simultaneously. However, this may impose restriction on scheduling, particularly, in TDD as well as full-duplex FDD. Thus, TDM between PUCCH and PUSCH may be considered. A UE may be configured with a set of subframes used for PUSCH transmission and the other set of subframes may be assumed to be available for PUCCH transmission. Alternatively, the set of subframes used for PUCCH transmission may also be configured. This may increase the latency of PUSCH transmission, thus, PUSCH piggyback may be more desirable approach when UL and DL grants are scheduled at the same time. Further, PRACH resource may be reserved, and PRACH subframes or reserved PRACH resources may not be used for PUCCH and/or PUSCH transmission. A UE may skip subframes where the resource for PRACH may collide with PUCCH/PUSCH transmission. This may be apply to only a low cost UE in normal coverage to avoid PUSCH uplink control information (UCI) multiplexing.

Since a UE may not be able to monitor unicast transmission while it is monitoring cell-common subband, in TDD, it is desirable to configure the same subband between cell-common data and PRACH/message 3. Similar to SIB1/paging subband, a few subbands may be dedicated for PRACH resource where different resource may be used for different CE levels. In other words, time (in terms of FH-SFG) and frequency location of cell common data and PRACH in TDD may be the same so that a UE can perform PRACH in the dedicated resources/time. In those subframes, a UE may not expect to transmit any unicast transmission (while receiving cell-common data or transmitting/performing RACH procedure).

If FDM is used among different CE levels for PRACH, and if three CE levels are supported, total four subbands may be used for PRACH resources. Those subbands may be prefixed and used for PRACH as well as cell-common data. This may be applicable to TDD as well as FDD to minimize the configuration overhead. PRACH may be hopped among four subbands (or resources configured for PRACH transmission). In terms of selecting those subbands, explicit or implicit (determined by system bandwidth implicitly) configuration may be considered.

Figure 16:
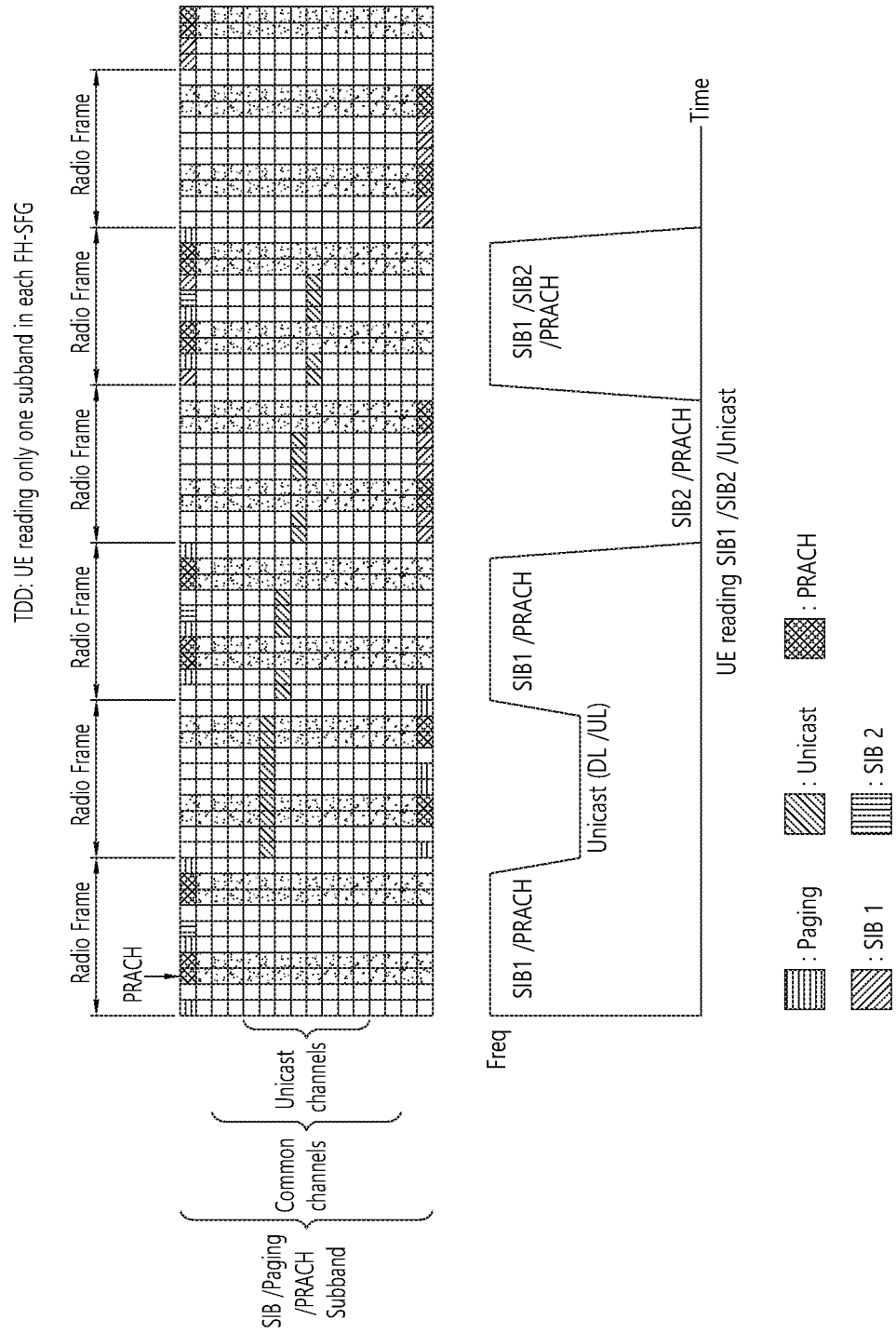
FIG. 16 shows another example of FH-SFG for cell common data and unicast data monitoring according to an embodiment of the present invention.

FIG. 16 shows another example of FH-SFG for cell common data and unicast data monitoring according to an embodiment of the present invention. Referring to FIG. 16, the TDD UE reads only one subband in each FH-SFG. In this embodiment, it is assumed that DL/UL configuration is DSUUDDSUUD, i.e. DL/UL configuration index 1.

In summary, the present invention proposes at least one of the followings for FH-SFG for cell common data and unicast monitoring.

Cell common data and unicast transmission may be allocated with different subbands (or different time).

SIB1/paging subbands may be prefixed and not changed (or, may be configured only via MIB signaling).

PRACH resource/subband may be aligned with cell common data in TDD.

Cell common data may hop over multiple subbands according to frequency hopping pattern.

Different or the same hopping pattern may be used for unicast subbands.

TDM between cell-common data and unicast transmissions may be assumed. In this case, collision may be handled by priority rule or by UE implementation.

TDM between PRACH and other UL transmissions may be assumed. In this case, collision may be handled by priority rule or by UE implementation.

A set of subbands used for cell common data and/or SIB1/paging may be signaled by MIB.

A set of subbands used for unicast transmission may be signaled by SIB

When channels collide in a FH-SFG (or in a subframe), the priority may be considered (.e.g. paging>SIB>RAR>unicast)

Further, as tight power control is not easily possible, it is expected that a low complexity UE in CE mode may use its configured maximum power. Since there may be a power configuration of cell maximum power level, i.e. $P_{EMAX}$, a UE, unless configured otherwise, may use the power of min $\{P_{CMAX}, P_{EMAX}\}$. However, since the power control is not utilized, when the UE utilizes the maximum power, it may cause heavy interference. Thus, the network may configure $P_{MAX}$ per UE which may be used as the upper bound of power. $P_{EMAX}$ may be configured differently for UEs in normal mode and CE mode. Further, power control for a low cost UE in normal coverage may be performed. In CE mode, power control may be disabled (or configured not to be used).

Hereinafter, frequency hopping pattern according to an embodiment of the present invention is described.

(1) SIB1: It is expected that a set of narrowbands for SIB1 is predetermined based on MIB signaling or implicitly. For example, a narrowband used for SIB1 may be defined as cell_ID % floor (floor ($N_{RB}^{DL}$/6)/2) or cell_ID % ceil (floor (($N_{RB}^{DL}$/6)/2). Alternatively, one bit may indicate whether two narrowbands or four narrowbands may be used for SIB1 via MIB signaling.

The frequency hopping pattern of SIB1 based on the set of narrowbands for SIB1 transmission is as follows. For set of narrowbands {NB1, NB2, NB3, NB4} (in order based on narrowband index) used for SIB1 transmission, hopping sequence may be NB1->NB4->NB2->NB3 (and may be iterated). Alternatively, when there are only two narrowbands, hopping sequence may take in turn. Alternatively, {0, 1, 2, 3} may be mapped to {NB1, NB2, NB3, NB4}, and VNB1, VNB2, VNB3 and VNB4 may be treated for frequency hopping. Hopping sequence with offset may also be considered. For example, (VNBi+offset) % 4 may be a hopping sequence. In other words, a fixed offset may be used for frequency hopping. Or, randomization function may be used among a set of {VNBi}

(2) Paging: It is expected that a set of narrowbands is configured for a paging. The set of narrowbands may be mapped to virtual narrowbands of which starting index corresponds to 0 to K−1 where K is the number of narrowbands configured for the paging. The frequency hopping sequence may be applied to the virtual narrowbands VNB0 to VNBK-1. Further, frequency hopping among virtual narrowbands may be based on mirroring or offset. For mirroring, regardless of a configured set of paging, NB (i+1)=NB (i)+(floor ($N_{RB}^{DL}$/6)/2) may be always used. Or, VNB0 may be mapped to VNBK-1, VNB1 may be mapped to VNBK-2, and so on. Or, VNB0 may be mapped to VNBK/2, VNB1 may be mapped to VNBK/2+1, and so on. Alternatively, fixed offset may be used for frequency hopping among virtual narrowbands. In this case, VNB (i+1)=VNB (i)+offset. Or, randomization function VNB (i+1)=VNB (i)+f_hop (I) may be used.

(3) Unicast: In terms of sharing the narrowbands with SIB1 and/or paging, two options may be possible. For one option, separate narrowbands may be used for all uncast transmission where the set of narrowbands may be indexed similar to virtual narrowband index and the hopping function (offset or randomization function) may be applied. For other option, shared narrowbands may be used.

For applying frequency hopping, at least one of the following options may be considered.

(1) Alt 1: Frequency hopping may occur (or restart) in the initial transmission of a channel. For example, for paging, frequency hopping may restart in control channel and PDSCH respectively. It is up to the network to handle potential collision. The frequency hopping may always start from the narrowband allocated to a UE. This may cause some collision issue between multiple channels.

(2) Alt 2: Frequency hopping may occur in every Ych subframes regardless of new transmission or invalid subframe. The location of a channel may be determined by logical narrowband index. Resource for the channel may be allocated and also based on the subframe and/or frame number. Hereinafter, "i" means "i-th" hopping where the same narrowband is used for $Y_{CH}$ for a channel.

(3) Alt 3: Frequency hopping may occur (or restart) from the control channel if the data is scheduled by the associated control channel. Otherwise, the frequency hopping may occur (or restart) from the data channel.

Different frequency hopping may be used per different channel. For example, SIB may follows Alt 1 or 3 describe above, whereas other channels may follow Alt 2 described above in DL transmission. For UL transmission, PRACH may follow Alt 1 or 3, whereas other channels may follow Alt 2. Regardless of hopping pattern, in terms of selecting a resource, it may be based on physical narrowband or logical narrowband. Whether to rely on physical narrowband or logical narrowband may be configured by the network per each channel or per UE or per CE level or cell-specifically. Further, M narrowbands may be allocated where the system has additional M narrowbands corresponding to the allocated narrowbands for frequency hopping. This however reduces the resource efficiency, thus, it is generally preferred to be able to allocate all narrowbands and address potential collision by aligning frequency hopping across channels with different repetition numbers.

In terms of PRACH, one PRACH resource may be configured with a hopping pattern as well. In general, when a narrowband is configured, it may also be configured with a hopping pattern. When a UE is configured with the narrowband, it may follow the hopping pattern configured in the narrowband. For example, for PRACH, the hopping pattern may be {NB1, NB2, NB1, NB2} in every 20 ms. For another example, for MTC PDCCH (M-PDCCH), the hopping pattern may be {NB1, NB2, NB1, NB2} in every 8 ms which starts at SFN=0 with subframe 0. For paging, similarly, separate hopping pattern may be considered. Hopping pattern may also include interval (Ych) of hopping as well as the starting offset if necessary.

In general, the frequency hopping may occur by mirroring only where NB (i+1)=NB (i)+(floor ($N_{RB}^{DL}$/6)/2), or may occur by a fixed offset (or a configurable offset per narrowband or function of a narrowband index).

In terms of configuration whether to use two or four narrowbands, for each narrowband signaling, the index of narrowband and 0 or 1 may be indicated. If 0 is indicated, it means that hopping may occur only between two narrowbands and 1 means that hopping may occur between four narrowbands. To determine narrowband to hop for two narrowbands, a fixed offset may be configured which is always used to determine the narrowband to hop. For example, when two narrowbands are used, (NB+offset) % floor (N-$^{DL}$/6) may be the narrowband to hop. When four narrowbands are used, (NB+offset) % floor ($N_{RB}^{DL}$/6)/2, floor ((NB+offset)+floor ($N_{RB}^{DL}$/6)/4*3), floor ((NB+offset)+floor ($N_{RB}^{DL}$/6)/4) may be used. In other words, based on offset and fixed function, a set of four narrowbands may be defined. Per each narrowband, a hopping granularity may be configured. The same granularity may be used for narrowbands used in the same frequency hopping. Or, a common value may be assumed. In case randomization is necessary, it is assumed that all narrowbands (or a set of configured or indicated by SIB1) may be used for frequency hopping similar to virtual narrowband.

For example, it is assumed that $S_{NB}(DL)$ is a set of DL narrowbands in the system bandwidth, $S_{NB}(UL)$ is a set of UL narrowbands in the system bandwidth, $S_{NB}(CH)$ is a set of narrowbands which may be used for frequency hopping of transmission of a channel (CH). For example, for SIB1, $S_{NB}(CH)$ may be a subset of $S_{NB}(DL)$, and $|S_{NB}(CH)|$=2 or 4. For another example, for DL transmission, $S_{NB}(CH)$ may be a subset of $S_{NB}(DL)$ or $S_{NB}(CH)=S_{NB}(DL)$. For another example, for PRACH, $S_{NB}(CH)$ may be a subset of $S_{NB}(DL)$. For another example, for UL transmission, $S_{NB}(CH)$ may be a subset of $S_{NB}(UL)$ or $S_{NB}(CH)=S_{NB}(UL)$.

For frequency hopping options for SIB1 is as follows.

(1) Option 1: $|S_{NB}(CH)|=2$, and frequency hopping may occur between NB1 and NB2.

(2) Option 2: $|S_{NB}(CH)|=4$, and frequency hopping may occur based on a fixed offset.

(3) Option 3: $|S_{NB}(CH)|=4$, and frequency hopping may occur based on a mirroring around center frequency.

For frequency hopping options for paging is as follows.

(1) Option 1: Frequency hopping may occur only among the configured narrowbands for paging. Hopping sequence may be based on a fixed offset. Or, hopping sequence may be based on a randomization function such as f_hop.

(2) Option 2: Mirroring function may be used.

(3) Option 3: A fixed offset may be used.

(4) Option 4: Randomization function such as f_hop may be used.

For frequency hopping options for M-PDCCH is as follows.

(1) Option 1: Frequency hopping may occur only among the configured narrowbands for M-PDCCH. Hopping sequence may be based on a fixed offset. Or, hopping sequence may be based on a randomization function such as f_hop.

(2) Option 2: Mirroring function may be used.

(3) Option 3: A fixed offset may be used.

(4) Option 4: Randomization function such as f_hop may be used.

Frequency hopping options for PDSCH is as follows.

(1) Option 1: Frequency hopping may occur only among the configured narrowbands for PDSCH. Hopping sequence may be based on a fixed offset. Or, hopping sequence may be based on a randomization function such as f_hop.

(2) Option 2: Mirroring function may be used.

(3) Option 3 A fixed offset may be used.

(4) Option 4: Randomization function such as f_hop may be used.

In case that one of options 2, 3 or 4 described above is used, a common set of narrowbands may be configured. By default, all the set of narrowbands may be assumed to be available for frequency hopping.

Whether the frequency hopping may occur over two narrowbands or four narrowbands may be configured by MIB and/or SIB or by higher layer depending on the channel.

For PDSCH, similar to PUSCH hopping, hopping indication may be given. By the hopping indication, a set of narrowbands which can be used for frequency hopping may be higher layer configured either by bitmap or offset (from which narrowbands to be used for frequency hopping). For M-PDCCH configuration, narrowband index, hopping_offset may be given which allows narrowband frequency hopping to different narrowband with hopping_offset. Another way to indicate is to add one bit to indicate whether 2 or 4 narrowbands are used.

In case the repetition number is smaller than the hopping granularity used in the system, and the repetition number is larger than 1, for PDSCH or PUSCH, frequency hopping may occur at least once where repetitions are evenly distributed to two hoppings. For M-PDCCH, the maximum number of repetition may be used to determine this criteria. In case of paging, this does not apply, as the number of repetition may not be clear for paging. In case of M-PDCCH for RAR, the RAR window may be assumed to be used for the criteria. In other words, when RAR window is smaller than the hopping granularity, RAR window may be split over two narrowbands.

In terms of dividing the number of repetitions over two hoppings, it may be equally divided by the number of subframes spanning regardless of actual number of repetitions or based on the number of repetitions. Also, considering subframes not usable for repetition, the number of repetition in consideration of invalid subframes may be used to determine whether the repetition is less or larger than the hopping granularity. In other words, in case the frequency hopping may occur due to invalid subframes in between, this type of operation may not be used. Further, this may also be applied for RAR window where RAR window may or may not account for invalid subframes. However, it is configured by the network, RAR window may be accounted for invalid subframes as well. In that case, the RAR window size may be directly used to determine whether this type of operation is needed or not. Another way is to configure different hopping granularity per narrowband.

Hereinafter, details of frequency hopping according to an embodiment of the present invention is described. Due to multimedia broadcast multicast services (MBMS), enhanced inter-cell interference coordination (eICIC) applicability, enhanced interference mitigation & traffic adaptation (eIMTA), etc., it is expected that a set of valid subframe which can be used for data/control repetition for MTC UE is signaled. Invalid subframes may have a set of invalid subframes which are cell-common (due to such as eIMTA, eICIC, etc.) and a set of invalid subframes which are UE-specific (due to such as invalid subframes from a measurement gap, frequency hopping, etc.). Thus, a repetition of a control or a data channel may not occur in consecutive manner and thus clarification on hopping granularity may be necessary.

For the convenience, the following parameters may be defined.

S_valid: size of bitmap or size of subframes where the signal of valid subframes may occur. In other words, S-valid may indicate the periodicity of a set of valid subframe. For example, S_valid may be 40 ms similar to absolute blank subframe (ABS) subframe configuration and/or multicast-broadcast single-frequency network (MBSFN) subframe configuration.

S_FH: size of frequency hopping granularity where a UE performs frequency hopping per each channel or every S_FH subframes S_PDCCH1, S_PDCCH2 . . . S_PDCCHM: size of PDCCH repetition number in the network supported by at least one UE. S_PDCCH1 may be the smallest repetition number of M-PDCCH and S_PDCCHM may be the largest repetition number of M-PDCCH.

S_PDSCH1, S_PDSCH2 . . . S_PDSCHN: size of PDSCH repetition number in the network supported by at least one UE. S_PDSCH1 may be the smallest repetition number of PDSCH and S_PDSCHN may be the largest repetition number of PDSCH.

S_Meas: size of measurement gap interval (e.g., 40 ms, 80 ms)

Since repetition with different numbers may occur by different UEs, to allow efficient multiplexing among different UEs, some handling for frequency hopping may be necessary. For this, at least one of the following options may be considered.

(1) Alt 1: S_FH may be one value, and may be signaled by the network. For example, S_FH may be 1. In this case, the benefit of multi-subframe channel estimation may not be enjoyed, as a UE changes its frequency in every subframe.

Figure 17:
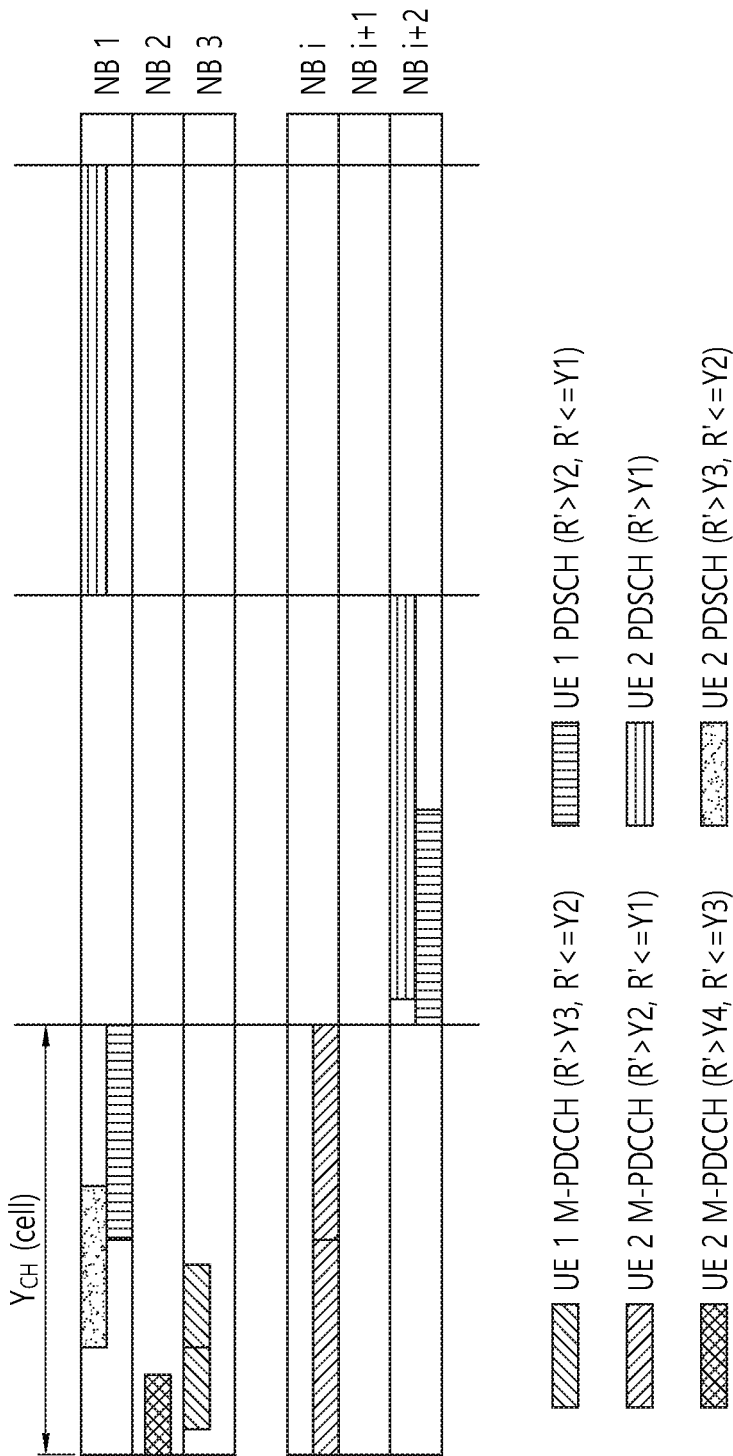
FIG. 17 shows an example of frequency hopping for MTC according to an embodiment of the present invention.

FIG. 17 shows an example of frequency hopping for MTC according to an embodiment of the present invention. FIG. 17 corresponds to Alt 1 described above. It is assumed that i+2=ceil (system bandwidth/6). It is further assumed that $Y1=Y_{CH}$ (cell)/1, $Y2=Y_{CH}$ (cell)/2, $Y3=Y_{CH}$ (cell)/$2^2$ ... $Yk=Y_{CH}$ (cell)/$2^{k-1}$.

(2) Alt 2: A UE may be configured with a set of $Y_{CH}$ implicitly or explicitly. The frequency hopping granularity may be determined as X which is the maximum value among values in a set of $Y_{CH}$. X may be smaller than R' which is the number of subframes carrying a channel. For example, if M-PDCCH repetition occurs in 4 times and three invalid subframes exist in between, R' may be 7. If a UE is configured with {1, 2, 4} for a set of $Y_{CH}$, X=4 may be chosen for frequency hopping. In terms of implicit configuration of a set of $Y_{CH}$, it may be determined by a set of R configured for M-PDCCH monitoring. If R=1, 4 may be configured for M-PDCCH monitoring case, and the set of $Y_{CH}$ may become {1, 4}.

Another way is to associate M-PDCCH CE level or repetition level with {m1, m2 ... mk} where a UE is configured with a subset of CE level or repetition level which maps to different $Y_{CH}$. In other words, a set of $Y_{CH}$ may be determined based on CE level and/or repetition level configuration. Even in this case, frequency hopping may occur in a cell-specific hopping granularity $Y_{CH}$ (cell). Also, the value belonging to the set may be always lower than $Y_{CH}$ (cell). Also, actual frequency hopping may occur in every $Y_{CH}$ subframes regardless of the number of invalid subframes within $Y_{CH}$ subframes. Another way of determining a set of $Y_{CH}$ is based on the configured narrowbands for M-PDCCH and scheduled PDSCH. For each narrowband, the hopping granularity $Y_{CH}$ may be signaled where the set is formed, e.g. {$Y_{CH}/2$, $Y_{CH}$, $2*Y_{CH}$}. If $Y_{CH}$ is not power of 2, ceil or floor function may be used, and in this case, frequency hopping may not occur evenly.

(3) Alt 3: The system may support a set of $Y_{CH}$ and the hopping granularity X per each channel may be determined such that X ∈ {a set of $Y_{CH}$}. X may be larger than R' which is the number of subframes to carry X regardless of invalid/valid subframes. In case of M-PDCCH, R' may be the maximum repetition number used for M-PDCCH transmission for a given channel. In case two different M-PDCCHs with different maximum R can be multiplexed into the same narrowband or same resources, the maximum repetition number R among those M-PDCCHs sharing the same resource may be assumed. In case different channels with different maximum numbers are multiplexed in the same resource (or may be multiplexed in the shared/same resources), the maximum R which may be used for a channel sharing the resource may be assumed. In other words, before the UE knows exact number of repetition, the UE may always assume the maximum number of repetitions for the channel(s) sharing some resource. This applies to other alternatives as well. The set may be implicitly acquired via repetition number configurations for cell-common M-PDCCH search space.

Figure 18:
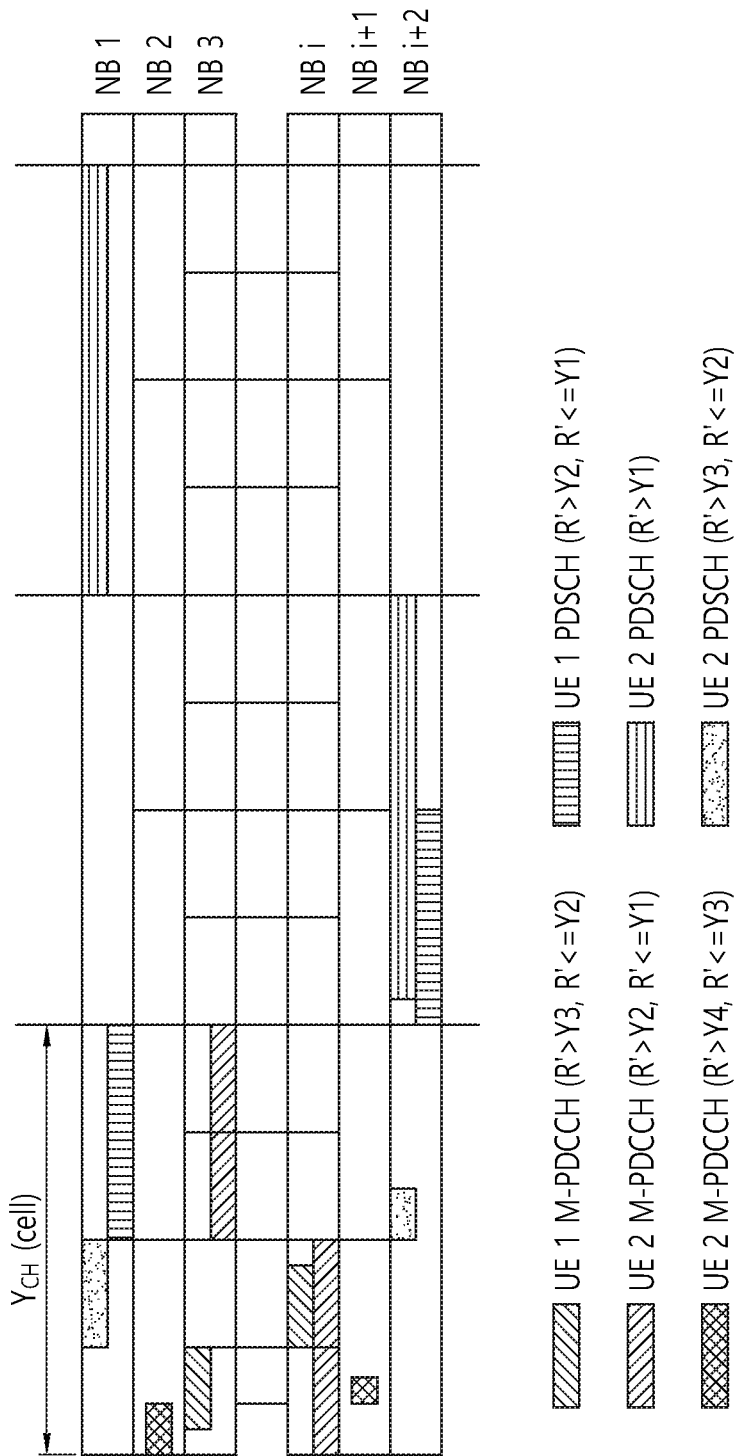
FIG. 18 shows another example of frequency hopping for MTC according to an embodiment of the present invention.

FIG. 18 shows another example of frequency hopping for MTC according to an embodiment of the present invention. FIG. 18 corresponds to Alt 2 or Alt 3 described above. It is assumed that i+2=ceil (system bandwidth/6). It is further assumed that $Y1=Y_{CH}$ (cell)/1, $Y2=Y_{CH}$ (cell)/2, $Y3=Y_{CH}$ (cell)/$2^2$ ... $Yk=Y_{CH}$ (cell)/$2^{k-1}$. In this embodiment, frequency hopping occurs with different granularity.

(4) Alt 4. Per each $Y_{CH}$, a set of narrowbands may be configured where the $Y_{CH}$ is assumed to be used. The value may be used as a minimum. For example, if R' is smaller than or equal to $Y_{CH}$ (cell), the value $Y_{CH}$ per each narrowband may be used for frequency hopping.

Figure 19:
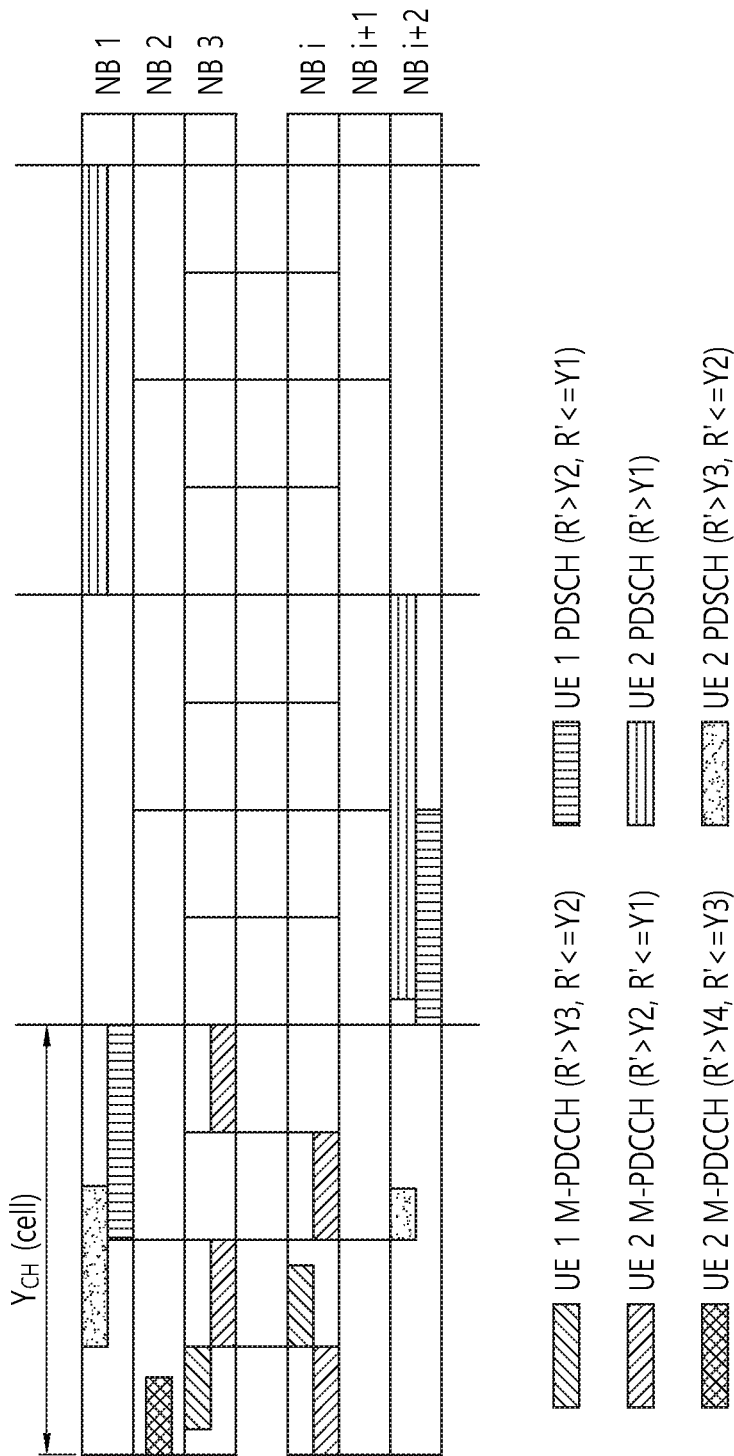
FIG. 19 shows another example of frequency hopping for MTC according to an embodiment of the present invention.

FIG. 19 shows another example of frequency hopping for MTC according to an embodiment of the present invention. FIG. 19 corresponds to Alt 4 described above. It is assumed that i+2=ceil (system bandwidth/6). It is further assumed that $Y1=Y_{CH}$ (cell)/1, $Y2=Y_{CH}$ (cell)/2, $Y3=Y_{CH}$ (cell)/$2^2$ ... $Yk=Y_{CH}$ (cell)/$2^{k-1}$.

(5) Alt 5: Assuming $Y_{CH}$ (cell) is a cell-specific hopping granularity, it may be used as long as R' for a channel is larger than $Y_{CH}$ (cell). In case R' is equal or smaller than $Y_{CH}$ (cell), frequency hopping with hopping granularity of $Y_{CH}$ (cell)/2 may be performed. The frequency hopping may occur in subframe_index % $Y_{CH}$ (cell)/2=0 (or based on SFN function). In other words, hopping granularity of half from the cell specific value may be used and the frequency hopping may occur in the middle of one period for $Y_{CH}$ (cell).

Figure 20:
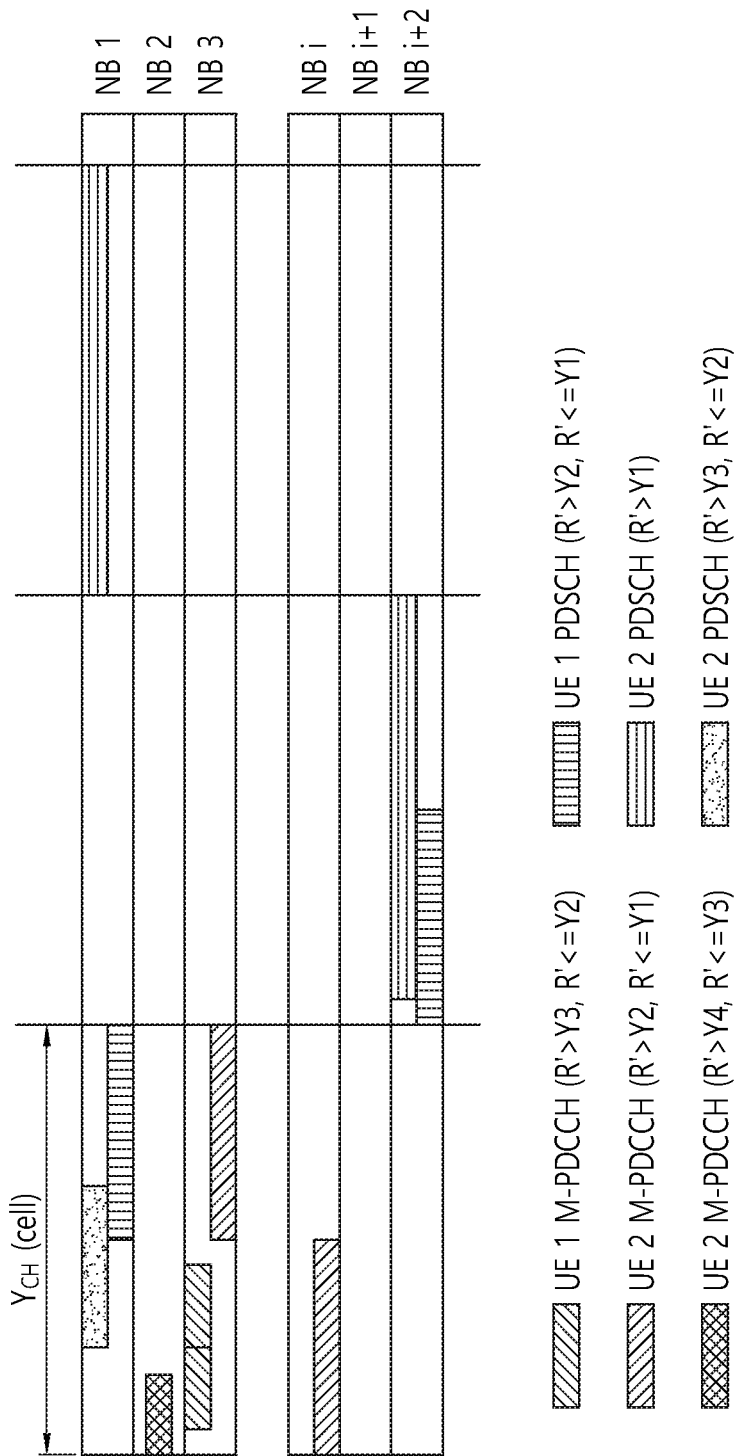
FIG. 20 shows another example of frequency hopping for MTC according to an embodiment of the present invention.

FIG. 20 shows another example of frequency hopping for MTC according to an embodiment of the present invention. FIG. 20 corresponds to Alt 5 described above. It is assumed that i+2=ceil (system bandwidth/6). It is further assumed that $Y1=Y_{CH}$ (cell)/1, $Y2=Y_{CH}$ (cell)/2, $Y3=Y_{CH}$ (cell)/$2^2$ ... $Yk=Y_{CH}$ (cell)/$2^{k-1}$.

Regardless of how $Y_{CH}$ is configured, the frequency hopping may occur aligned with the timing of each channel transmission. In other words, hopping granularity may be applied by one of the following options.

(1) The hopping granularity may be applied per subframe basis regardless of how many subframes are used for transmission for a channel. In case, different hopping granularity may be used between one channel and the successive the other channel with the same narrowband. The transmission of other channel may be delayed until the next available hopping granularity or may be transmitted following the hopping granularity of the first/previous channel. For example, it is assumed that $Y_{CH}$ for M-PDCCH is 4, the repetition number R' for M-PDCCH is 9, $Y_{CH}$ for PDSCH is 2, and the repetition number of R' for PDSCH is 5. Further it is assumed that both channels are transmitted in the same narrowband. The hopping sequence may be 4 M-PDCCH in NB1, 4 M-PDCCH in NB2, 1 M-PDCCH in NB1, pause for frequency retuning gap (if used), 2 PDSCH in NB1, 2 PDSCH in NB2, and 1 PDSCH in NB1. If frequency retuning gap is not used, the hopping sequence may be 4 M-PDCCH in NB1, 4 M-PDCCH in NB2, 1 M-PDCCH in NB1, 3 PDSCH in NB1, 2 PDSCH in NB2. In this sense, it may be more desirable to use the same hopping granularity at least between M-PDCCH and PDSCH. Between M-PDCCH and PUSCH, in TDD, when the same narrowband is used, the same hopping granularity may be used. In other words, for the channels by a UE sharing the same narrowband, the same Ych may be used in large CE case.

(2) The hopping granularity may be applied per transmission basis regardless of how many subframes are used for transmission for a channel. In this case, hopping boundary may change per transmission. When using the example described above, the frequency hopping may occur, e.g. 4 M-PDCCH in NB 1, 4 M-PDCCH in NB2, 1 M-PDCCH 1 NB1, 2 PDSCH in NB1, 2 PDSCH in NB2, and 1 PDSCH in NB1. The boundary of hopping sequence may not be aligned between transmissions.

(3) The hopping granularity may be applied per transmission based on the actual repetition. In this case, frequency hopping may occur per actual repetition or count only valid subframes usable for repetition. If R for M-PDCCH is 8, R' for M-PDCCH is 16 (assuming one invalid subframe in every other subframe), and hopping granularity is 4, actual hopping may occur in every 7 ms including invalid subframes in between. Thus, with this option, the hopping boundary may be different depending on the number/set of valid subframes usable for repetition.

However, the options (2) and (3) may become challenging in terms of scheduling due to possible collision among multiple UEs with different number of repetitions. Thus, some restrictions in terms of repetition numbers and the number of invalid/valid subframe numbers may be necessary.

Another way of determining $Y_{CH}$ is based on the number of narrowbands used for frequency hopping. In case two narrowbands are used for frequency hopping for a channel, $Y_{CH}$ may be determined based on Alt 2, 3, 4 or 5 mentioned above. In case of four narrowbands used for frequency hopping, a cell-specific value may be used. Also, if four narrowbands are used with alternative(s) mentioned above, the granularity may be divided by 4 instead of 2, such that at least one narrowband for a channel may be enjoyed. This, however, complicates the frequency hopping and multiplexing among different UEs with different repetition numbers.

Another example of determining $Y_{CH}$ for a channel may be as follows.

(1) For M-PDCCH, if the configured number of PRBs is equal to the number of PRBs configurable to a MTC UE (e.g. 6 PRBs for UEs supporting 1.4 MHz), then the alternative(s) mentioned above may be considered for hopping granularity. Otherwise, the hopping granularity may be fixed as $Y_{CH}$ (cell).

(2) For PDSCH, if the scheduled resource block size is equal to the number of PRBs configurable to a MTC UE (e.g. 6 PRBs for UEs supporting 1.4 MHz), then the alternative(s) mentioned above may be considered for hopping granularity. Otherwise, the hopping granularity may be fixed as $Y_{CH}$ (cell).

(3) For SIB/paging and other cell control data such as RAR, fixed $Y_{CH}$ (cell) may be used if the maximum repetition number for the channel is larger than $Y_{CH}$ (cell) regardless of actual repetition number used per individual transmission.

For frequency hopping across two narrowbands, different narrowbands may be used in case different $Y_{CH}$ is used for a channel. For example, if there is N narrowbands in the system bandwidth, it may be assumed that two narrowbands are paired. For example, i-th narrowband may be paired with N/2+i-th narrowband. This paired narrowbands may be used when $Y_{CH}$ (cell) is used. In case $Y_{CH}$ is different from $Y_{CH}$ (cell), the paired narrowbands may be changed. For example, per $Y_{CH}$ value different from $Y_{CH}$ (cell), a narrowband used for frequency hopping may be configured. In case different $Y_{CH}$ is used, the UE may hop to the configured narrowband as a paired narrowband for frequency hopping, instead of the paired narrowband configured for $Y_{CH}$ (cell). For example, if NB1 is configured for $Y_{CH}=Y_{CH}$ (cell)/2, and a UE is scheduled M-PDCCH or PDSCH in NB2 where NB2 hops to NB10 as a default pair, the UE may hop between NB2 and NB1 following the hopping granularity. Alternatively, for a small repetition case, there may be a reserved narrowband used for a hopping pair to avoid collisions with other transmissions.

One example of configuration is to configure different hopping granularity per CE level used for PRACH repetition levels. Or, for each channel, hopping granularity may be defined per repetition level. Table 1 show an example of configuration of hopping granularity per PRACH CE level.

TABLE 1

| PRACH CE level | RSRP threshold | PRACH repetition # | PRACH starting subframe granularity | $Y_{CH}$ | RAR M-PDCCH narrowband index | Frequency hopping over 2 NBs or 4 NBs |
|---|---|---|---|---|---|---|
| CE1 | −4 | 1 | 1 | 4 | 1 | 2 |
| CE2 | −10 | 5 | 5 | 8 | 2 | 2 |
| CE3 | −15 | 10 | 10 | 8 | 3 | 4 |
| CE4 | −20 | 20 | 20 | 8 | 3 | 4 |

Table 2 shows an example of configuration of hopping granularity for each repetition level of a channel.

TABLE 2

| Repetition level | $Y_{CH}$ | RAR M-PDCCH narrowband index | FH hopping over 2 NBs or 4 NBs |
|---|---|---|---|
| R1 | 4 | 1 | 2 |
| R2 | 8 | 2 | 2 |
| R3 | 8 | 3 | 4 |
| R3 | 8 | 3 | 4 |

For paging and SI transmissions, the cell-specific value of $Y_{COMMON}$ may be applied (related to $Y_{CH}$ configuration). For M-PDCCH/PDSCH of RAR transmission, where the repetition number is equal to or smaller than the cell-specific value of $Y_{COMMON}$ which is applicable for common channels (SI (excluding SIB1), RAR, paging), $Y_{RAR}$ for RAR may be same to $Y_{CH}$ configured for the corresponding CE level for unicast transmission (related to $Y_{CH}$ configuration). In this case, the repetition number may be determined by the repetition level of M-PDCCH of RAR regardless of actual repetition number of M-PDCCH. With hopping granularity $Y_{CH}$, frequency location may be switched according to a pattern every $Y_{CH}$ consecutive subframes including invalid subframes.

Further, when determining whether the repetition level of RAR is smaller than $Y_{COMMON}$ which is applicable for common channels (SI (excluding SIB1), RAR, paging), it may be determined based on the smallest repetition level of RAR M-PDCCH. Or, it may be determined based on the largest repetition number of RAR M-PDCCH. Or, it may be determined based on the middle repetition number of RAR M-PDCCH. Or, it may be determined based on the coverage level of PRACH. The repetition number R for each channel may be defined in the specification or configured by higher layer or configured by SIB.

Table 3 show an example of repetition numbers of M-PDCCH, PDSCH, PUSCH, and PUCCH according to repetition level.

TABLE 3

| Repetition level | M-PDCCH | PDSCH | PUSCH | PUCCH |
|---|---|---|---|---|
| R1 | 1 | 1 | 1 | 1 |
| R2 | 4 | 8 | 8 | 4 |
| R3 | 8 | 16 | 16 | 8 |
| R3 | 16 | 32 | 32 | 16 |

Another way is to configure different frequency hopping per narrowband, and the parameters may be defined by the configured narrowband. Further, for RAR, YCH may be defined per CE level for the first example, and YCH may be a common value for second example. The same concept may be applicable for other messages such as Message 3/Message 4.

Configuration of repetition and frequency hopping according to an embodiment of the present invention is described.

Table 4 shows an example of configuration of PRACH.

TABLE 4

| CE level | PRACH repetition number | RSRP threshold | RAR M-PDCCH region | $Y_{CH}$ for RAR | $Y_{CH}$ (for RAR M-PDCCH) |
|---|---|---|---|---|---|
| 0 | 1 | −127 dBm | (1, 8, 2, 7) | 1 | 1 (of OFF) |
| 5 | 4 | −132 dBm | (2, 9, 3, 6) | 2 | 4 |
| 10 | 16 | −137 dBm | (3, 5) | 8 | 8 |
| 15 | 64 | −142 dBm | (3, 5) | 8 | 8 |

In this case, there may be a set of repetition numbers per each channel. For example, M-PDCCH may correspond to the set of repetition numbers {1, 2, 4, 8, 16, 32, 64}. PDSCH may correspond to the set of repetition numbers {1, 2, 4, 8, 16, 32, 64, 128, 256} assuming 100 bits in 6 PRBs (or default MCS may be used, default value may be different). In case TBS is increased, the repetition number may be determined as ceil (or floor) (configured_TBS/100)*configured repetition number. For example, if the configured repetition number is 32 and 200 bits are scheduled, 64 repetition subframes may be used. MCS, the number of RBs, etc., may be used to determine TBS. PUSCH may correspond to the set of repetition numbers {1, 4, 8, 16, 32, 64, 128, 246, 512, 1024} assuming 200 bits in 1 PRB (or MCS=9, default value may be different). PUCCH may correspond to the set of repetition numbers {1, 2, 4, 8, 16, 32, 64}.

For the convenience, the following repetition related factors may be defined.
- CE level: CE level may be determined by PRACH resource, the level of reference signal received power (RSRP)
- Repetition level: Repetition level may be determined per channel based on a reference format. For example, for M-PDCCH, 24 enhanced CCE (ECCE) with DCI used for unicast may be used to determine repetition level.
- Actual repetition number: Actual repetition number may be configured or indicated by DCI. For M-PDCCH and PDSCH/PUSCH, it may be indicated by DCI. For example, for PDSCH, repetition number may be computed based on MCS=5. When a larger MCS is used, the repetition number may be changed, and the change factor may be specified in the MCS table. The similar thing may be assumed for PUSCH as well. Further, this may be used only for CE mode B in case of large repetition is used. Or, this may be used only when the number of RBs is not indicated by DCI. Table 5 shows an example of MCS table and repetition factor.

TABLE 5

| Index | MCS | Repetition factor |
|---|---|---|
| 0 | — | 0.8 |
| 1 | — | 0.9 |
| ... | — | 1 |
| 5 | — | — |
| 6 | — | — |
| ... | — | — |
| 10 | — | 2 |
| ... | — | ... |
| 15 | — | 4 |

For PUCCH, the repetition number may be rather fixed and determined/configured semi-statically.

Determining of repetition level for each channel may be as follows. It may be assumed that a subset of repetition numbers is given to a UE per channel.

Paging M-PDCCH: Repetition numbers {1, 4, 16, 32} may be prefixed/predefined.

RAR M-PDCCH: According to RAR CE level, the starting repetition number may be configured from SIB per CE level. From the starting, it may be assumed that maximum 2 or 4 repetition numbers are monitored. For example, if the repetition number is configured as 2, it will monitor 2, 4 or 2, 4, 8, 16. It may also be considered that the maximum repetition number is configured. Alternatively, it may also be assumed that the repetition number is prefixed. For example, in CE mode A, {1, 2, 4, 8} may be used, and CE mode B {8, 16, 32, 64} may be used.

M-PDCCH for other messages: Similar mechanism to RAR may be used. Different number or reconfiguration of maximum repetition number may be configured. It may also be possible that repetition numbers are configured/prefixed per CE level such that CE level 0={1, 2}, CE level 1={1, 2, 4, 8}, CE level 2={8, 16, 32}, and CE level 3={16, 32, 64}.

The set of repetition numbers used per each CE level of M-PDCCH may be configured with PRACH configuration.

Repetition number set for PDSCH/PUSCH: It may be prefixed per CE level or per CE mode or configured in PRACH as well. Reconfiguration of repetition number may also be possible.

When the repetition numbers are configured/determined per each channel, the hopping granularity may be determined according to the repetition number. For example, hopping granularity may be determined by either repetition level or index or actual repetition number. In terms of hopping granularity configuration, at least one of the following approach may be considered.

One $Y_{CH}$ may be configured per CE level. Each channel may be configured with different CE level, and then the hopping granularity may be different.

$Y_{CH}$ may be configured per CE level per channel.

$Y_{CH}$ may be configured per repetition numbers in the network. Alternatively, it may be configured for the representative numbers only. Table 6 shows an example of configuration of YCH per repetition numbers.

TABLE 6

| Repetition Number | $Y_{CH}$ | Set of NBs for M-PDCCH | Set of NBs for PDSCH | Set of NBs for PUSCH |
|---|---|---|---|---|
| 1 | 1 | {NB1, NB2, NB3, NB4} | {NB1, NB2} | {NB1, NB2} |
| 4 | 2 | {NB1, NB2, NB3, NB4} | {NB1, NB2} | {NB1, NB2} |
| 8 | 4 | {NB5, NB6, NB7, NB8} | {NB9, NB10} | {NB3, NB4} |
| 16 | 8 | {NB5, NB6, NB7, NB8} | {NB9, NB10} | {NB5, NB6} |
| 64 | 8 | {NB1, NB2, NB3, NB4} | {NB7, NB8} | {NB7, NB8} |
| 256 | 16 | {NB1, NB2, NB3, NB4} | {NB7, NB8} | {NB9, NB10} |
| 1024 | 32 | {NB1, NB2, NB3, NB4} | {NB7, NB8} | {NB1, NB2} |

Repetition numbers in between two values may follow the lower number. For example, repetition of 32 may be used if the above table is used.

Since it may become very difficult to configure different narrowbands without avoiding collision, it is generally desirable to reduce the number of $Y_{CH}$. In that sense, narrowband sets may be configured per $Y_{CH}$. Table 7 shows an example of sets of narrowbands per $Y_{CH}$.

TABLE 7

| $Y_{CH}$ | Set of NBs for M-PDCCH | Set of NBs for PDSCH | Set of NBs for PUSCH |
|---|---|---|---|
| 0 (OFF) | All NBs | All NBs | All NBs |
| 1 | {NB1, NB2, NB3, NB4} | {NB1, NB2} | {NB1, NB2} |
| 2 | {NB1, NB2, NB3, NB4} | {NB1, NB2} | {NB1, NB2} |
| 4 | {NB5, NB6, NB7, NB8} | {NB9, NB10} | {NB3, NB4} |
| 8 | {NB5, NB6, NB7, NB8} | {NB9, NB10} | {NB5, NB6} |
| 8 | {NB1, NB2, NB3, NB4} | {NB7, NB8} | {NB7, NB8} |
| 16 | {NB1, NB2, NB3, NB4} | {NB7, NB8} | {NB9, NB10} |
| 32 | {NB1, NB2, NB3, NB4} | {NB7, NB8} | {NB1, NB2} |

In the network, it may be assumed that at most 4 $Y_{CH}$ values are available. When the UE determines its $Y_{CH}$ based on the repetition number, then the UE may look up the narrowbands of frequency hopping used for transmission. However, this restrict the narrowbands configurable for PDSCH transmission. Thus, generally it is also preferred that two narrowbands are used for frequency hopping for data transmission and the scheduled narrowband index may be used to determine the set of usable narrowbands with frequency hopping. In other words, frequency hopping pattern may determine the location of narrowbands. Frequency hopping pattern may be indicated by DCI.

Further, different behaviors may be applied in CE mode A and B respectively. CE mode A corresponds to a mode where a UE is configured with either normal (or no repetition) or small repetition. CE mode B corresponds to a mode where a UE is configured with relatively large repetition. For example, frequency hopping pattern or the set of narrowbands may be configured for CE mode A, whereas for CE mode B, the narrowband set is determined by the predefined hopping pattern or rule.

Further, if a UE is configured with YCH which is larger than the repetition number, it may be assumed that the hopping may not occur within one repetition. Even in case frequency hopping is not enabled, the value of YCH may be used for multi-subframe channel estimation, power computation, same precoding assumptions, and so on. In other words, the table of YCH configuration may be used for other parameter unless such a value is reconfigured explicitly by the network. Further, the default value of UE-specific search space (USS) may come from the RAR M-PDCCH configuration including SS set, hopping granularity, narrowband set, etc.

Overall, there may be five set of SS configurations in SIB as follows.

CSS: for paging CSS, a set of repetition levels for CSS may be either prefixed or configured by SIB. L may be s assumed to be 24 or configurable by the network (1 aggregation level is preferred). Default blind detection candidates may be 1 per each {L, R} combination. The set of narrowbands used for paging M-PDCCH hopping may be also configured by SIB.

4 SS for RAR M-PDCCH: Per each SS, L is assumed to be derived based on the CE level or indicated by the SIB. R may also be determined by the CE level or indicated by the SIB. The number of blind detection candidates per each {L, R} may be assumed to be 1 unless otherwise noted. Or, if L<16, blind detection candidates may be 2, and if L>=16, blind detection candidate may be 1. The set of narrowbands used for this may also be configurable. $Y_{CH}$ may also be configurable. Based on CE level, the set of narrowbands, and $Y_{CH}$ may be lookup from a predefined table. In other words, predefined table may be specified. This configuration may also include PRB set and the number of PRBs.

Further, additionally 4 SS for M-PDCCH message 3 and/or USS may be configured. For this, similar configuration to RAR M-PDCCH may be assumed. Further, USS per UE may be configured. In this case, different configuration can be configured per UE.

The hopping granularity of $Y_{CH}$ may be defined differently depending on the number of narrowbands used for frequency hopping. Table 8 shows an example of the hopping granularity of $Y_{CH}$ depending on the number of narrowbands used for frequency hopping.

TABLE 8

| Repetition Number | $Y_{CH}$ (2 NB is used) | $Y_{CH}$ (4 NB is used) | X (precoding assumption, when hopping is not used) |
|---|---|---|---|
| 1 | 1 (or OFF) | 1 | Same as $Y_{CH}$ (2NB is used or 4NB is used) |
| 4 | 2 | 1 | Same as $Y_{CH}$ (2NB is used or 4NB is used) |
| 8 | 4 | 2 | Same as $Y_{CH}$ (2NB is used or 4NB is used) |
| 16 | 8 | 4 | Same as $Y_{CH}$ (2NB is used or 4NB is used) |
| 64 | 8 | 4 | Same as $Y_{CH}$ (2NB is used or 4NB is used) |
| 256 | 16 | 8 | Same as $Y_{CH}$ (2NB is used or 4NB is used) |
| 1024 | 32 | 16 | Same as $Y_{CH}$ (2NB is used or 4NB is used) |

In the use of frequency hopping, it is important to use virtual narrowband concept where physical narrowband may be computed based on virtual NB, SFN/subframe index and $Y_{CH}$.

For frequency hopping determination for paging, a set of narrowbands (physical narrowbands) may be configured for paging and hopping sequence may be computed based on cell ID and the narrowband set. The number of narrowbands may be either 2 or 4. When the set of NB is {NB1, NB2, NB3, NB4}, one hopping mechanism is to use f_hop assuming Nsb=1 per each $Y_{CH}$ starting SFN=0 with subframe=0.

In such case, virtual narrowband may be computed based on UE ID and the UE may compute the physical narrowband location based on the hopping function (which is a function of cell ID, SFN, $Y_{CH}$). For example, {VNB1, VNB2, VNB3, VNB4}={NB1, NB2, NB3, NB4} at $1^{st}$ hopping, {NB2, NB1, NB4, NB3} in $2^{nd}$ hopping, and so on. The offset or mirroring may also be used for hopping pattern.

For RAR M-PDCCH, a set of physical narrowbands may be configured which will be used for frequency hopping. Virtual narrowband among those configured narrowbands for frequency hopping may be further configured to each UE based on RNTI. At least, the virtual narrowband for M-PDCCH scheduling message 3 may be configured based on temporary C-RNTI. For example, among the configured narrowbands, based on temporary C-RNTI, the narrowband location may be selected. The physical narrowband location of such a virtual narrowband may be computed based on frequency hopping function. For example, for RAR, if {NB1, NB2, NB7, NB8} is configured, a UE may select its virtual narrowband based on temporary C-RNTI % 4 (or 2 if two narrowbands are configured). For example, if a UE is configured with NB1, the UE may determine the physical location of NB1 based on frequency hopping pattern assuming NB1 is the virtual NB1. In other words, virtual NB1 may be the same as physical NB1 in SFN=0 with subframe index=0, and its physical location may change based on the hopping function. In terms of configuration, the set of narrowbands used for M-PDCCH frequency hopping may be configured per CE level or pre repetition level or per UE-specific manner. Generally, it is desirable to configure the set of narrowband s per CE level and depending on UE's CE level on M-PDCCH, the frequency locations may be determined.

Further, for RAR M-PDCCH, it may be assumed that it will be configured per CE level. In terms of $Y_{CH}$, it may be determined based on the smallest number of repetition or configured per each CE level.

For PDSCH, the narrowband index scheduled in resource allocation may also be based on virtual narrowband. The physical location may also be computed from the list of narrowbands used for PDSCH frequency hopping. For the simplicity, PDSCH hopping may be assumed that it will occur within 2 narrowbands only, and in that case, additional configuration may not be necessary. Otherwise, for each UE, the set of narrowbands may be configured when frequency hopping is enabled. When configuration is not available, based on a predetermined rule, the set of narrowbands may be assumed for PDSCH depending on how many narrowband is used (2 or 4). However, PDSCH narrowband (virtual narrowband) may be configured by DCI and based on the function, the physical location may be determined. Another approach is to indicate physical narrowband location as a starting narrowband, then hopping function may follow afterwards. This approach may require indication of narrowband even in large repetition case.

Maximize peak data rate in normal coverage according to an embodiment of the present invention is described. In case of normal coverage without repetition, it is generally desirable to maximize the peak rate. One mechanism of maximizing the peak rate is to configure valid DL subframes as [111100000] which is repeated in every 10 m and valid UL subframes as [1111011110] which is repeated in every 10 ms. Also, for handling PUCCH, it may be good to specify that DL is used in the first half and UL is used in the second half Another example is to configure valid DL subframes as [1111000000] and valid UL subframe as [0000011110]. However, when counting valid UL subframes, valid DL subframes may also be used for counting. Table 9 shows this example.

TABLE 9

|  | D1 | D2 | D3 | D4 |  |  |  |  | D5 | D6 | D7 | D8 |
|---|---|---|---|---|---|---|---|---|---|---|---|---|
| M-PDCCH | U1 | U2 | U3 | U4 |  |  |  |  | U5 | U6 | U7 | U8 |
| PDSCH |  | D1 | D2 |  |  |  |  |  | D3 | D4 | D5 | D6 |
| Switch |  |  |  |  | S |  |  | S |  |  |  |  |
| PUCCH |  |  |  |  |  |  |  |  |  |  |  |  |
| PUSCH |  |  |  |  |  | U1 | U2 | U3 | U4 |  |  |  |
|  |  |  |  |  |  |  | D1 | D2 |  |  |  |  |

Another example is to configure valid DL subframes as [111111000000] and valid UL subframe as [111111011110]. Table 10 shows this example.

TABLE 10

|  | D1 | D2 | D3 | D4 |  |  |  |  | D5 | D6 | D7 | D8 |
|---|---|---|---|---|---|---|---|---|---|---|---|---|
| M-PDCCH |  | U1 | U2 | U3 | U4 |  |  |  | U5 | U6 | U7 | U8 |
| PDSCH |  | D1 | D2 | D3 | D4 |  |  |  | D3 | D4 | D5 | D6 |
| Switch |  |  |  |  | S |  |  | S |  |  |  |  |
| PUCCH |  |  |  |  |  |  |  |  |  |  |  |  |
| PUSCH |  |  |  |  |  | U1 | U2 | U3 | U4 |  |  |  |
|  |  |  |  |  |  | D1 | D2 | D3 | D4 |  |  |  |

Enhanced MTC (eMTC) configuration according to an embodiment of the present invention is described. In case two or four narrowbands are used for frequency hopping, the configuration of narrowbands used for frequency hopping may be as follows.

(1) Two narrowbands may be configured for four narrowbands case and the other two narrowbands may be selected by mirroring of two narrowbands configured.

(2) Four narrowbands may configured explicitly. Similar mechanism may also be applied to two narrowbands case.

For PDSCH frequency hopping, semi-static configuration of narrowband(s) may be considered along with frequency hopping. Or, cell-specific grouping of hopping narrowbands may be configured by SIB or the hopping narrowbands may be implicitly determined based on a predefined function. For example, hopping narrowbands may include narrowbands Initial_NB, Initial_NB+offset, Initial_NB+2*offset, Initial_NB+3*offset (for four narrowbands case), or initial_NB, Max_NB_Num−initial_NB, initial_NB+Max_NB_Num/2, and mirroring of the last narrowband. In other words, mirroring pattern or offset may be used to determine the narrowbands implicitly. The starting narrowband or the configured narrowband may be determined based on UE ID or C-RNTI or explicitly configured via message 4.

When a UE is scheduled with a DL grant or UL grant, the TBS is computed as follows.

(1) TBS lookup from (the number of RBs, MCS): To change the TBS, MCS may be changed, and the repetition level may be changed accordingly.

(2) TBS lookup from (the number of RBs, MCS, and repetition level): The repetition level used for M-PDCCH may be a baseline repetition level. TBS may be looked up by (repetition level*the number of RBs, MCS). The actual repetition number may be baseline repetition number for PDSCH*repetition level. Repetition level may be {½, 1, 2, 4}. The baseline repetition number may be prefixed per M-PDCCH repetition level assuming a representative TBS is scheduled to 6 PRBs for PDSCH, and 1 PRB for PUSCH.

TBS lookup from (the number of RBs, MCS) with repetition level is used as mentioned in the second approach.

Another approach is to signal the number of RBs in addition to repetition level. A UE may assume that all 6 PRBs (for PDSCH) are used for data scheduling, though the number of RBs is signaled for TBS computation. Similar mechanism may also be applicable to PUSCH. Another mechanism is to have a relatively larger repetition level fields (such as 3 bits) to indicate different number of repetition levels/numbers.

Another approach is to locate TBS by (the number of RBs, MCS) and find the actual repetition number by looking-up repetition number table which has entries of (MCS, repetition number) corresponding to the configured repetition level. If the number of RBs is not 6 (for PDSCH) or 1 (for PUSCH), the number may be accordingly adapted. For example, if 3 PRBs are allocated, the repetition number may be doubled as the repetition number is computed based on 6 PRB assumption. Alternatively, the repetition number may be doubled and signaled. Table 11 shows an example of repetition number table.

TABLE 11

| MCS Index $I_{MCS}$ | Modulation Order Qm | Repetition Level 1 | Repetition Level 2 | Repetition Level 3 |
|---|---|---|---|---|
| 0 | 2 | 1 | 1 | 2 |
| 1 | 2 | 1 | 2 | 4 |
| 2 | 2 | 1 | 2 | 6 |
| 3 | 2 | 1 | 3 | 8 |
| 4 | 2 | 1 | 4 | 10 |
| 5 | 2 | 1 | 5 | 12 |
| 6 | 2 | 1 | 6 | 14 |
| 7 | 2 | 1 | 7 | 16 |
| 8 | 2 | 1 | 8 | ... |
| 9 | 2 | 1 | 9 | |
| 10 | 4 | 1 | 9 | |
| 11 | 4 | 1 | 10 | |
| 12 | 4 | 1 | 11 | |
| 13 | 4 | 1 | 12 | |
| 14 | 4 | 1 | 13 | |
| 15 | 4 | 1 | 14 | |
| 16 | 4 | 1 | 15 | |
| 29 | 2 | | reserved | reserved |
| 30 | 4 | | | |
| 31 | 6 | | | |

The similar approach may be applied for PUSCH TBS/repetition number as well.

In terms of search space configuration, a set of number of PRBs, narrowbands (used for frequency hopping), localized/distributed configuration may be preconfigured. A subset of those may be signaled by SIB for each SS such as for paging, RAR, M-PDCCH scheduling message 4, and USS. Table 12 show an example of a set of number of PRBs, narrowbands, localized/distributed configuration.

TABLE 12

| Configuration # | Number of PRBs | Localized/distributed | PRBs | NBs |
|---|---|---|---|---|
| 0 | 2 | L | <1, 4> | <0, NB#DL/2, NB#DL/4, 3*NB#DL/4> |
| 1 | 2 | D | <1, 4> | <0, NB#DL/2, NB#DL/4, 3*NB#DL/4> |
| 2 | 4 | L | <2, 3, 5, 6> | <0, NB#DL/2, NB#DL/4, 3*NB#DL/4> |
| 3 | 4 | D | <2, 3, 5, 6> | <0, NB#DL/2, NB#DL/4, 3*NB#DL/4> |
| 4 | 2 + 4 only | L | all | <0, NB#DL/2, NB#DL/4, 3*NB#DL/4> |
| 5 | 2 + 4 only | D | all | <0, NB#DL/2, NB#DL/4, 3*NB#DL/4> |
| 6 | 2 | L | <1, 4> | Add offset 1 (from configuration 0) |
| 7 | 2 | D | <1, 4> | Add offset 1 (from configuration 0) |
| 8 | 4 | L | <2, 3, 5, 6> | Add offset 1 (from configuration 0) |
| 9 | 4 | D | <2, 3, 5, 6> | Add offset 1 (from configuration 0) |
| 10 | 2 + 4 only | L | all | Add offset 1 (from configuration 0) |
| 11 | 2 + 4 only | D | all | Add offset 1 (from configuration 0) |
| 12 | 2 | L | <1, 4> | Add offset 2 (from configuration 0) |
| 13 | 2 | D | <1, 4> | Add offset 2 (from configuration 0) |
| 14 | 4 | L | <2, 3, 5, 6> | Add offset 2 (from configuration 0) |
| 15 | 4 | D | <2, 3, 5, 6> | Add offset 2 (from configuration 0) |
| 16 | 2 + 4 only | L | all | Add offset 2 (from configuration 0) |
| 17 | 2 + 4 only | D | all | Add offset 2 (from configuration 0) |
| 18 19 31 | ... | | | ... |

In SIB, the following configuration may be possible for SS

For paging: 4, repetition levels=CE0, CE1, CE2, CE3
For RAR CE 0: 3, repetition levels=CE0
For RAR CE 1: 9, repetition levels=CE1
For RAR CE2: 16, repetition levels=CE2
For RAR CE3: 22, repetition levels=CE3.

For message 4, the same configuration on RAR SS may be used. Alternatively, explicit configuration may also be possible. For initial USS configuration, configuration used for Message 4 may be assumed unless Message 4 explicitly configures different SS configuration or a UE is reconfigured. In other words, a set of possible configuration may specified, and the subset may be configured in SIB. Unless explicitly configured otherwise, SS for RAR may be used for subsequent M-PDCCH transmission. One or subset of parameters may be reconfigured. For example, only the narrowbands may be reconfigured while keeping other parameters. Starting subframe set may also be configured explicitly or implicitly.

Figure 21:
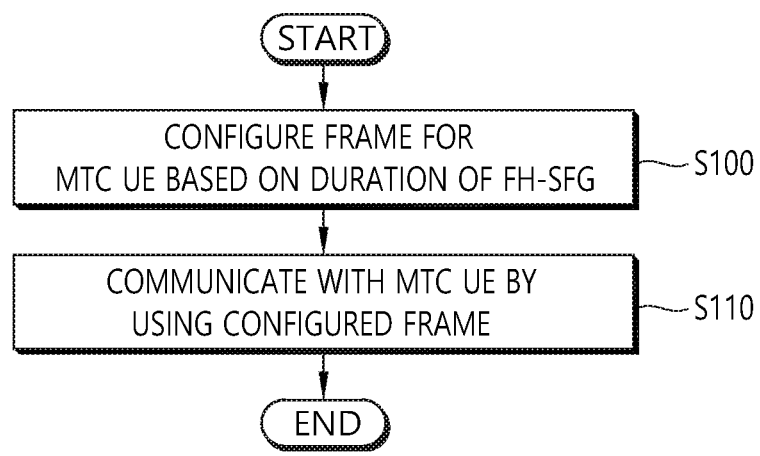
FIG. 21 shows a method for communicating, by a base station, with a MTC UE according to an embodiment of the present invention.

FIG. 21 shows a method for communicating, by a base station, with a MTC UE according to an embodiment of the present invention.

In step S100, the base station configures a radio frame for the MTC UE based on a duration of a FH-SFG. The duration of the FH-SFG may be configured regardless of valid DL subframes usable for the MTC UE or valid UL subframes usable for the MTC UE. Or, the duration of the FH-SFG may be configured by counting valid DL subframes usable for the MTC UE or valid UL subframes usable for the MTC UE. The duration of the FH-SFG may be configured as one radio frame or half-radio frame.

The radio frame may be configured further based on a frequency retuning gap. The frequency retuning gap may be determined based on a subband index allocated to the MTC UE. Or, the radio frame may be configured further based on a duration of M-TTI. Or, the radio frame may be configured further based on at least one of a period, an offset or a duration of an M-DCI region. The offset may be configured differently per each MTC UE. The period and the duration may be configured by broadcast signaling. The duration of the M-DCI region may be the same as an M-TTI. Or, the radio frame may be configured further based on at least one of a period, an offset or a duration of an M-PDSCH region. Or, the radio frame may be configured further based on a set of valid DL subframes and a set of valid UL subframes.

In step S110, the base station communicates with the MTC UE by using the configured radio frame.

Figure 22:
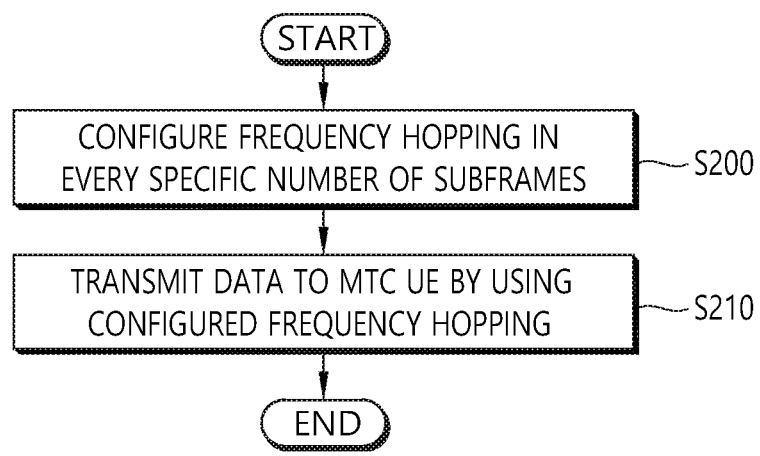
FIG. 22 shows a method for transmitting, by a base station, data to a MTC UE according to an embodiment of the present invention.

FIG. 22 shows a method for transmitting, by a base station, data to a MTC UE according to an embodiment of the present invention.

In step S200, the base station configures a frequency hopping in every specific number of subframes which corresponds to a frequency hopping granularity. The frequency hopping may be configured in every specific number of subframes regardless of new transmission or invalid subframes not usable for the MTC UE. A location of a channel by the frequency hopping may be determined by a logical narrowband index. A location of a channel by the frequency hopping may be determined by at least one of a subframe number or a frame number. The frequency hopping may be configured by a fixed offset. The frequency hopping may be configured over either two narrowbands or four narrowbands. Whether the frequency hopping is configured over either two narrowbands or four narrowbands may be configured via MIB or SIB.

The frequency hopping granularity may be configured differently per CE level. The frequency hopping granularity may be configured by cell specifically when the data is paging or system information. A frequency location for the data may be switched according to the frequency hopping in every specific number of subframes.

In step S210, the base station transmits data to the MTC UE by using the configured frequency hopping.

Figure 23:
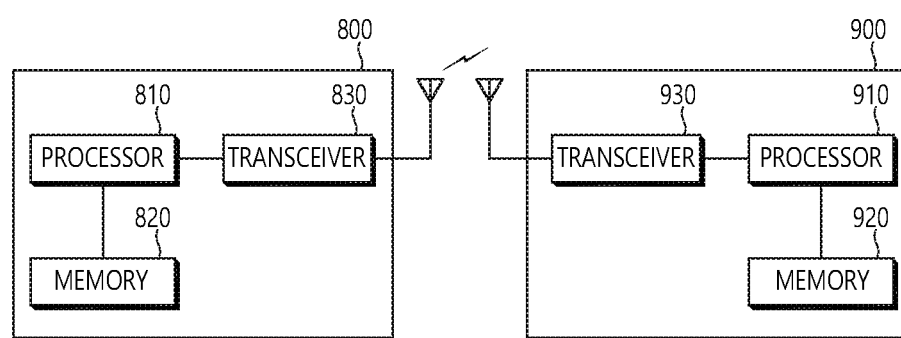
FIG. 23 shows a wireless communication system to implement an embodiment of the present invention.

FIG. 23 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a base station (BS) and comprising:
   configuring a radio frame which consists of N subframes, wherein a first subframe of the radio frame scheduled for a first machine type communication (MTC) user equipment (UE) is used as frequency retuning subframe by a second MTC UE, and a last subframe of the radio frame scheduled for the second MTE UE is used as frequency retuning subframe by the first MTE UE; and
   communicating with the first MTC UE and the second MTC UE based on the radio frame, by using a frequency hopping which is configured in every N subframes,
   wherein the radio frame is configured based on a period, an offset and a duration of an MTC downlink control information (M-DCI) region, and
   wherein the offset is configured differently for the first MTC UE and the second MTE UE.

2. The method of claim 1, wherein a duration of the radio frame is configured regardless of valid downlink (DL) subframes usable for MTC UE or valid uplink (UL) subframes usable for MTC UE.

3. The method of claim 1, wherein a duration of the radio frame is configured by counting valid DL subframes usable for MTC UE or valid UL subframes usable for MTC UE.

4. The method of claim 1, wherein a duration of the radio frame is configured as one radio frame or a half-radio frame.

5. The method of claim 1, wherein the radio frame is configured further based on a duration of an MTC transmission time interval (M-TTI).

6. The method of claim 1, wherein the period and the duration are configured by broadcast signaling.

7. The method of claim 1, wherein the duration is same as an MTC transmission time interval (M-TTI).

8. The method of claim 1, wherein the radio frame is configured further based on a duration of an MTC physical downlink shared channel (M-PDSCH) region.

9. The method of claim 1, wherein the radio frame is configured further based on a set of valid DL subframes and a set of valid UL subframes.

10. A base station (BS) in a wireless communication system, the BS comprising:
- a memory configured to store information;
- a transceiver configured to transmit and receive information; and
- a processor coupled to the memory and the transceiver, the processor configured to:
- configure a radio frame which consists of N subframes,
- wherein a first subframe of the radio frame scheduled for a first machine type communication (MTC) user equipment (UE) is used as frequency retuning subframe by a second MTC UE, and a last subframe of the radio frame scheduled for the second MTE UE is used as frequency retuning subframe by the first MTE UE; and
- control the transceiver to communicate with the first MTC UE and the second MTC UE based on the radio frame, by using a frequency hopping which is configured in every N subframes,
- wherein the radio frame is configured based on a period, an offset and a duration of an MTC downlink control information (M-DCI) region, and
- wherein the offset is configured differently for the first MTC UE and the second MTE UE.

11. The BS of claim 10, wherein a duration of the radio frame is configured regardless of valid downlink (DL) subframes usable for MTC UE or valid uplink (UL) subframes usable for MTC UE.

12. The BS of claim 10, wherein a duration of the radio frame is configured by counting valid DL subframes usable for MTC UE or valid UL subframes usable for MTC UE.

13. The BS of claim 10, wherein a duration of the radio frame is configured as one radio frame or a half-radio frame.

14. The BS of claim 10, wherein the radio frame is configured further based on a duration of an MTC transmission time interval (M-TTI).

15. The BS of claim 10, wherein the radio frame is configured further based on a duration of an MTC physical downlink shared channel (M-PDSCH) region.

* * * * *